United States Patent
Erbele et al.

(10) Patent No.: US 12,296,445 B2
(45) Date of Patent: May 13, 2025

(54) METHOD FOR LEARNING APPLICATION SHUTDOWNS BY FINDING CHARACTERISTIC SIGNAL SHAPES

(71) Applicant: Robert Bosch GmbH, Stuttgart (DE)

(72) Inventors: Simon Erbele, Nufringen (DE); Wolfgang Herberger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 354 days.

(21) Appl. No.: 17/754,380

(22) PCT Filed: Sep. 23, 2020

(86) PCT No.: PCT/EP2020/076484
§ 371 (c)(1),
(2) Date: Mar. 31, 2022

(87) PCT Pub. No.: WO2021/069208
PCT Pub. Date: Apr. 15, 2021

(65) Prior Publication Data
US 2022/0266429 A1    Aug. 25, 2022

(30) Foreign Application Priority Data
Oct. 9, 2019    (DE) .................. 10 2019 215 415.8

(51) Int. Cl.
*B25B 23/147*    (2006.01)
*B25F 5/00*    (2006.01)
(Continued)

(52) U.S. Cl.
CPC .......... *B25B 23/1475* (2013.01); *B25F 5/001* (2013.01); *G05B 13/0265* (2013.01); *G05B 13/042* (2013.01); *B25D 2250/221* (2013.01)

(58) Field of Classification Search
CPC ................. B25B 23/1475; B25F 5/001; B25D 2250/221
(Continued)

(56) References Cited

U.S. PATENT DOCUMENTS 7,861,796 B2 *  1/2011  DeCicco ................... H02P 7/29
                                                             173/217
9,744,658 B2     8/2017  Simeone et al.
(Continued)

FOREIGN PATENT DOCUMENTS

CN        2767078 Y      3/2006
CN      101520868 A      9/2009
(Continued)

OTHER PUBLICATIONS

International Search Report corresponding to PCT Application No. PCT/EP2020/076484, mailed Dec. 23, 2020 (German and English language document) (5 pages).

*Primary Examiner* — Md Azad
(74) *Attorney, Agent, or Firm* — Maginot, Moore & Beck LLP

(57) ABSTRACT

The disclosure relates to a method for operating a handheld power tool comprising an electric motor and the method comprising: S1 providing comparative information, comprising: S1a providing at least one model signal shape, the model signal shape being assignable to progress of work of the handheld power tool; S1b providing a threshold value of correspondence; S2 ascertaining a signal of an operating variable of the electric motor; S3 comparing the signal of the operating variable with the model signal shape and ascertaining assessment of correspondence from the comparison, the assessment of correspondence at least partially taking place on the basis of the threshold value of correspondence; S4 detecting the progress of work at least partially on the basis of the assessment of correspondence ascertained in method step S3; the providing of the comparative information at least partially taking place on the basis of a learning process.

19 Claims, 15 Drawing Sheets

(51) Int. Cl.
    *G05B 13/02*     (2006.01)
    *G05B 13/04*     (2006.01)

(58) Field of Classification Search
    USPC .......................................................... 700/47
    See application file for complete search history.

(56) References Cited

U.S. PATENT DOCUMENTS

| | | | | |
|---|---|---|---|---|
| 2016/0121467 | A1* | 5/2016 | Ng | B25B 23/1475 |
| | | | | 81/464 |
| 2016/0375570 | A1* | 12/2016 | Boeck | G05B 19/4062 |
| | | | | 700/169 |
| 2017/0217001 | A1* | 8/2017 | Oishi | B25B 21/02 |
| 2018/0290270 | A1* | 10/2018 | Manasseh | H02P 6/32 |
| 2020/0246954 | A1* | 8/2020 | Yamada | B25D 17/11 |
| 2020/0276680 | A1* | 9/2020 | Green | H02K 11/21 |

FOREIGN PATENT DOCUMENTS

| | | |
|---|---|---|
| CN | 101795933 A | 8/2010 |
| CN | 102036787 A | 4/2011 |
| CN | 102858497 A | 1/2013 |
| CN | 104573374 A | 4/2015 |
| CN | 108145207 A | 6/2018 |
| CN | 109685342 A | 4/2019 |
| DE | 10 2005 035 046 A1 | 2/2007 |
| DE | 10 2015 005 901 A1 | 12/2015 |
| DE | 10 2017 206 064 A1 | 10/2018 |
| DE | 10 2005 035 046 B4 | 3/2019 |
| EP | 0 480 380 A2 | 4/1992 |
| EP | 0 753 377 A1 | 1/1997 |
| EP | 3 202 537 A1 | 8/2017 |

\* cited by examiner

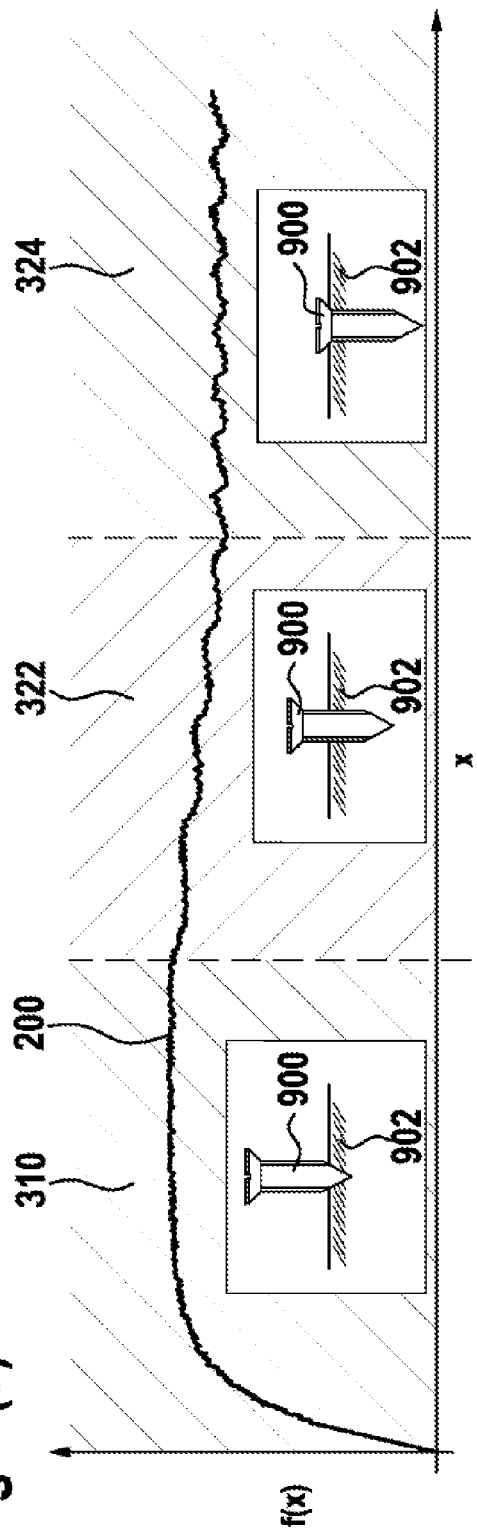
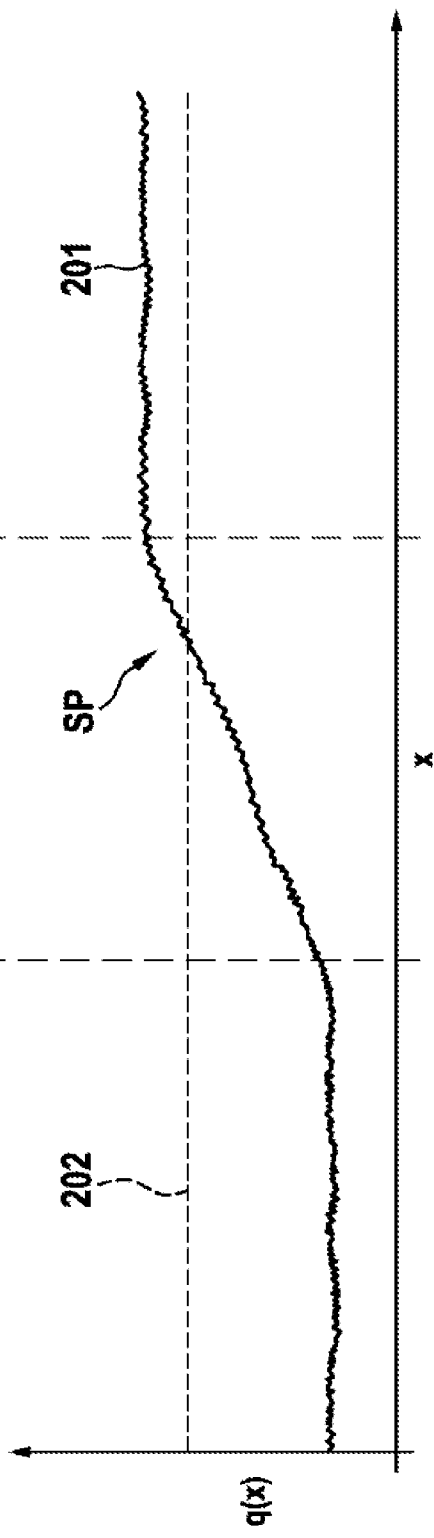

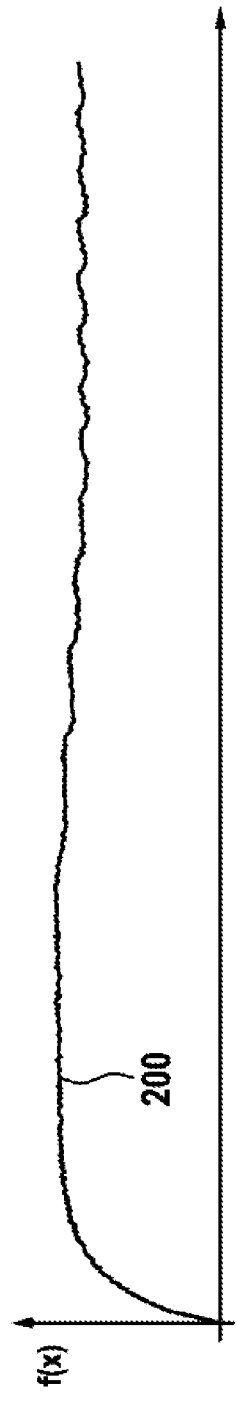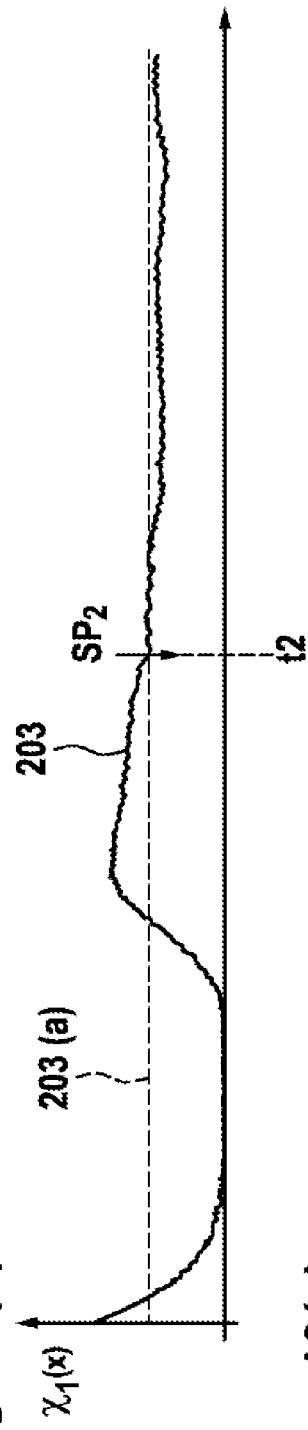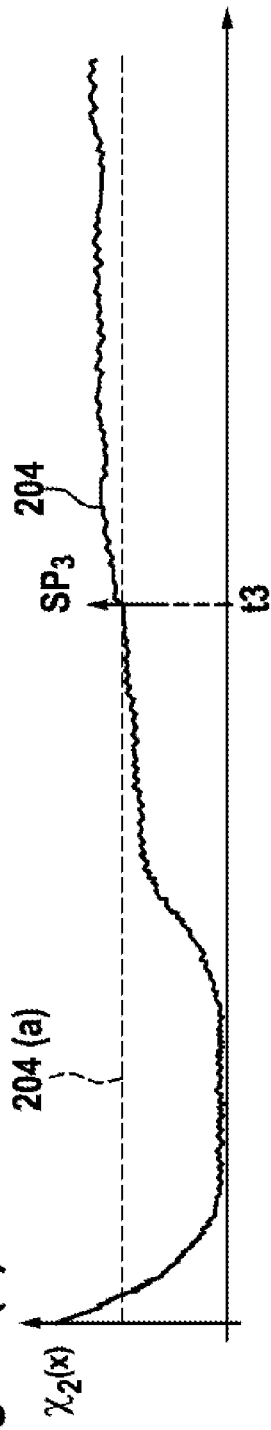

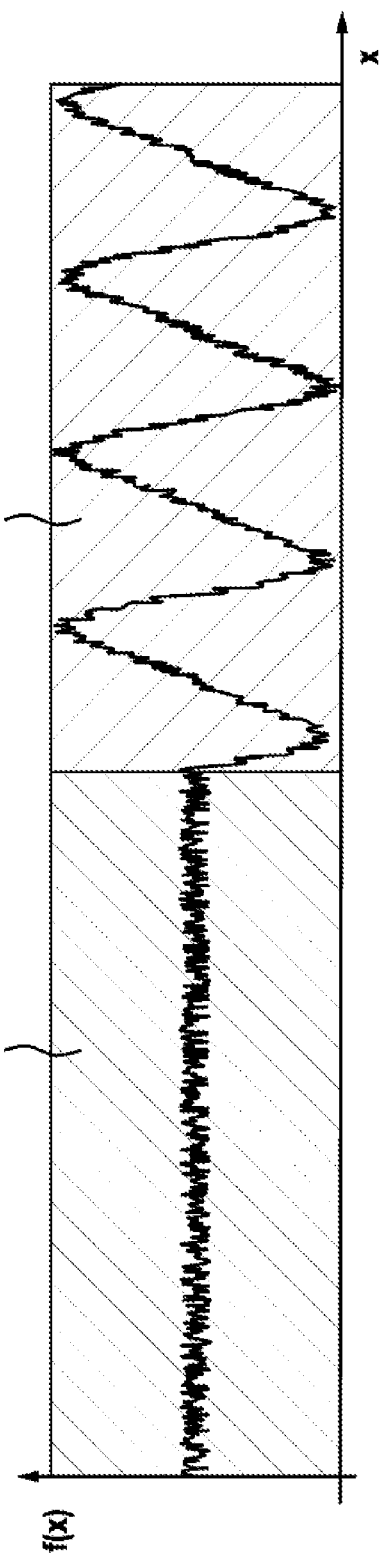 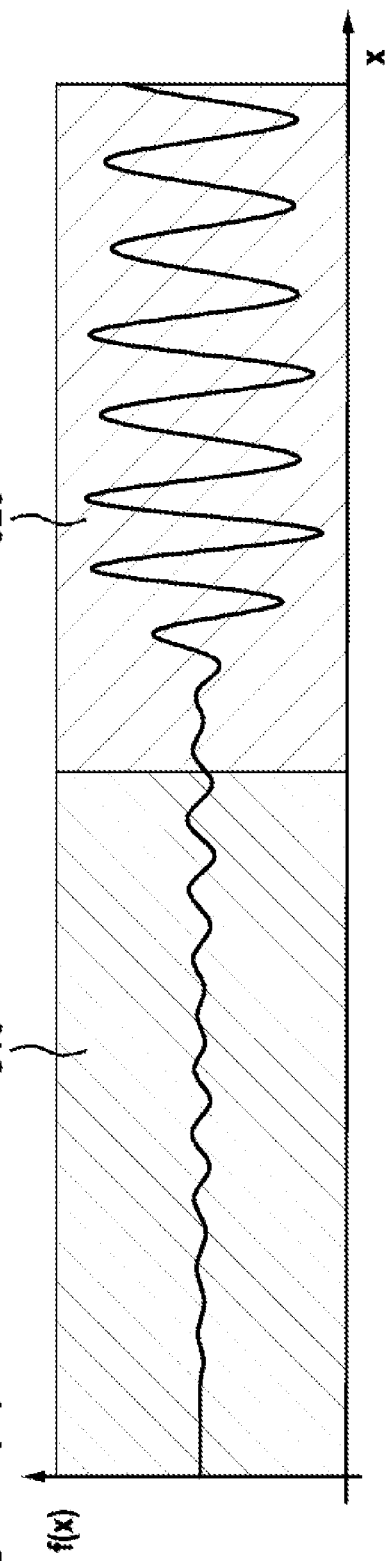

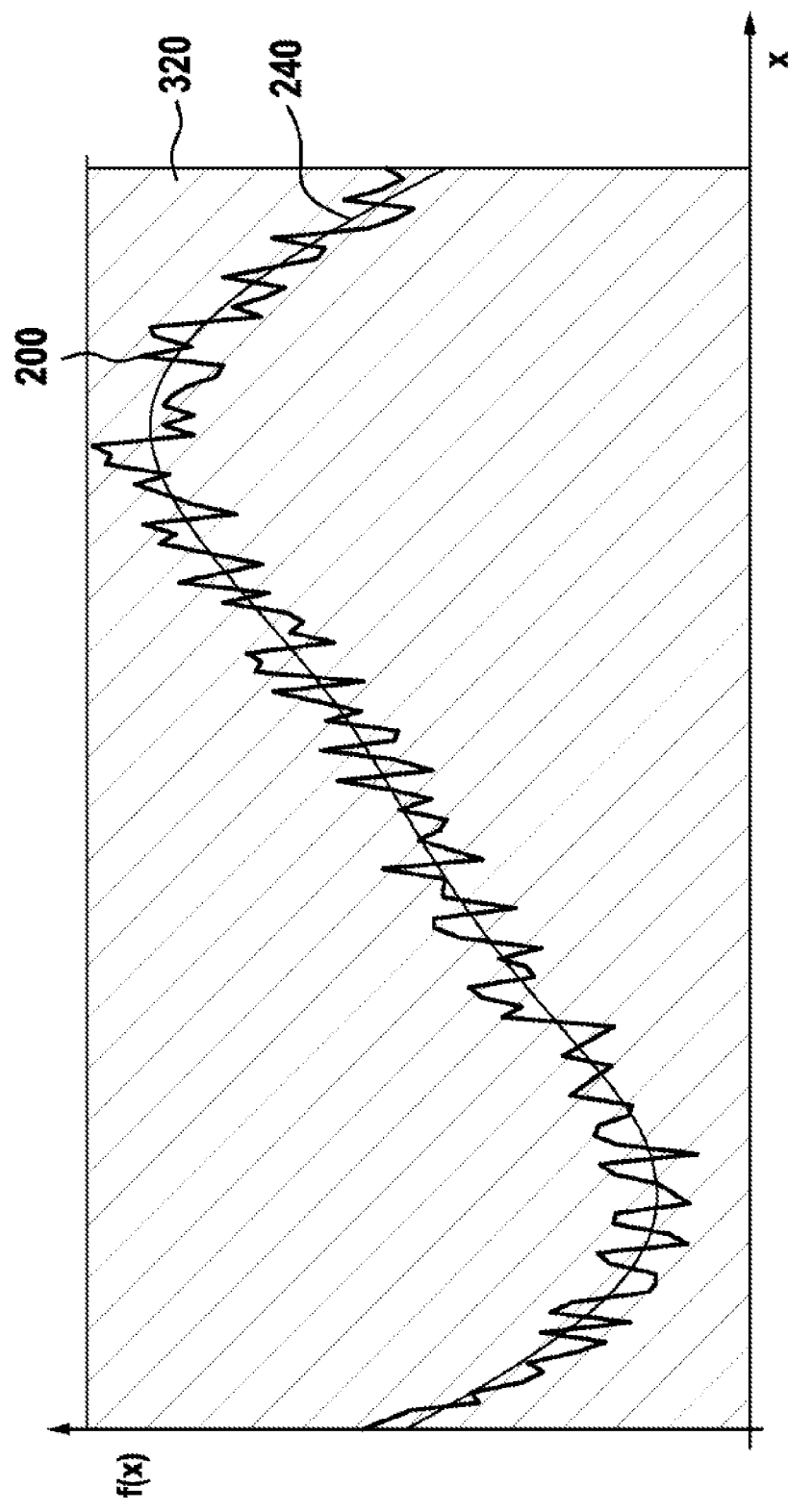

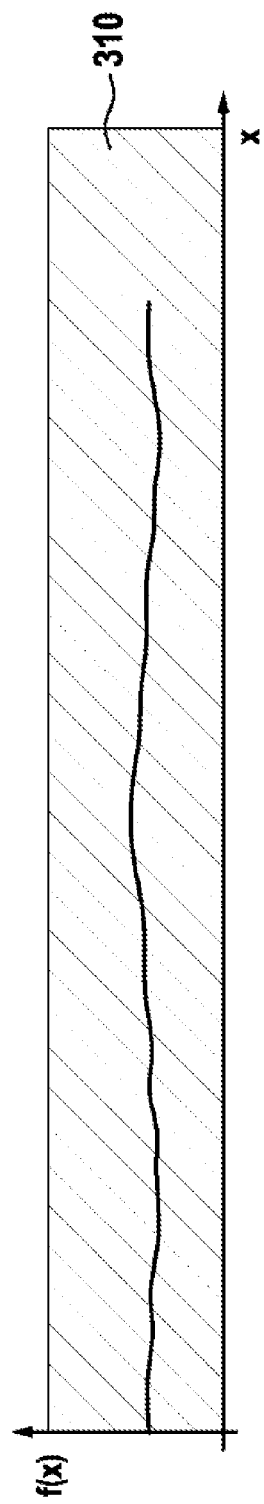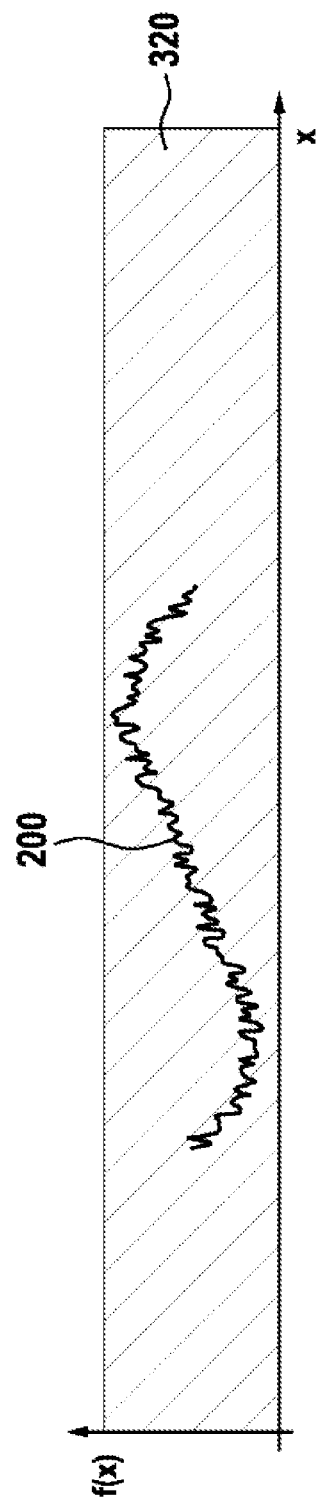

METHOD FOR LEARNING APPLICATION SHUTDOWNS BY FINDING CHARACTERISTIC SIGNAL SHAPES

This application is a 35 U.S.C. § 371 National Stage Application of PCT/EP2020/076484, filed on Sep. 23, 2020, which claims the benefit of priority to Serial No. DE 10 2019 215 415.8, filed on Oct. 9, 2019 in Germany, the disclosures of which are incorporated herein by reference in their entirety.

The disclosure relates to a method for operating a handheld power tool, and to a handheld power tool designed for carrying out the method. In particular, the present disclosure relates to a method for screwing in or unscrewing a threaded means with a handheld power tool.

BACKGROUND

The prior art, see for example EP 3 202 537 A1, discloses rotary impact screwdrivers for tightening screw elements, such as for example threaded nuts and screws. A rotary impact screwdriver of this type comprises for example a setup in which an impact force is transmitted to a screw element in a rotating direction by a rotary impact force of a hammer. The rotary impact screwdriver that has this setup comprises a motor, a hammer to be driven by the motor, an anvil, which is struck by the hammer, and a tool. The rotary impact screwdriver further comprises a position sensor, which senses a position of the motor, and a controller, which is coupled to the position sensor. The controller detects an impact of the impact mechanism, calculates a drive angle of the anvil caused by the impact, on the basis of the output of the position sensor, and controls the brushless DC motor on the basis of the drive angle.

U.S. Pat. No. 9,744,658 also discloses an electrically driven tool with an impact mechanism, the hammer being driven by the motor. The rotary impact screwdriver further comprises a method for recording and playing back a motor parameter.

When using rotary impact screwdrivers, a high level of concentration on the progress of work is required on the part of the user, in order when there are changes of certain machine characteristics, for example the starting or stopping of the impact unit, to react correspondingly, for instance to stop the electric motor and/or to carry out a change of the speed by way of the hand switch. Since the user is often unable to react quickly enough, or appropriately, to progress of work, it may be the case when using rotary impact screwdrivers for screwing-in operations that for example overscrewing of screws occurs, and when performing unscrewing operations that screws fall out if they are unscrewed at too high a speed.

It is therefore generally desired to largely automate operation and help the customer to achieve fully completed progress of work more easily and to ensure reliably reproducible screwing-in and unscrewing operations of high quality. Furthermore, the user should be supported by machine-initiated reactions or routines of the device that are appropriate for the progress of work. Examples of such machine-initiated reactions or routines comprise for instance switching-off of the motor, changing the motor speed or triggering a message to the user.

The provision of such intelligent tool functions may take place, inter alia, by the identification of the operating state at the particular time. Identification of the same is carried out in the prior art, independently of the determination of progress of work or the status of an application, for example by monitoring the operating variables of the electric motor, such as for instance the speed and electrical motor current. This involves investigating the operating variables in respect of whether certain limit values and/or threshold values are reached. Corresponding evaluation methods work with absolute threshold values and/or signal gradients.

It is disadvantageous here that a fixed limit value and/or threshold value can in practice only be perfectly set for one application. As soon as the application changes, the associated current or speed values or their progressions over time also change, an impact detection on the basis of the set limit value and/or threshold value or their progressions over time no longer working.

It can therefore happen that for example an automatic shutdown on the basis of the detection of impact operation reliably shuts down in various speed ranges in the case of some applications when self-tapping screws are used, but no shutdown takes place in other applications when self-tapping screws are used.

In the case of other methods for determining operating modes with rotary impact screwdrivers, additional sensors, for instance acceleration sensors, are used in order to deduce the operating mode at a particular time from oscillational states of the tool.

Disadvantages of these methods are additional cost expenditure for the sensors and losses in the robustness of the handheld power tool, since the number of installed components and electrical connections increases in comparison with handheld power tools without this sensor system.

Furthermore, simple information as to whether or not the impact mechanism is working is often not sufficient to be able to make accurate statements about the progress of work. Thus, for example, when screwing in certain wood screws, the rotary impact mechanism already starts very early, while the screw is not yet completely screwed into the material but the required torque already exceeds the so-called disengagement torque of the rotary impact mechanism. A reaction solely on the basis of the operating state (impact operation and no-impact operation) of the rotary impact mechanism is therefore not sufficient for a correct automatic system function of the tool, such as for example a shutdown.

In principle, solving the problem of largely automating operation also exists in the case of other handheld machine tools, such as for instance impact power drills, and so the disclosure is not restricted to rotary impact screwdrivers.

SUMMARY

The object of the disclosure is to provide an improved method compared to the prior art for operating a handheld power tool which at least partially overcomes the aforementioned disadvantages, or at least to provide an alternative to the prior art. A further object is to provide a corresponding handheld power tool.

These objects are achieved by means of the respective subject of the disclosure. Advantageous refinements of the disclosure are the subject of the detailed embodiments.

The disclosure discloses a method for operating a handheld power tool, the handheld power tool having an electric motor. In this case, the method comprises the steps of:

S1 providing comparative information, comprising the steps of

S1a providing at least one model signal shape, the model signal shape being assignable to progress of work of the handheld power tool;

S1b providing a threshold value of correspondence;

S2 ascertaining a signal of an operating variable of the electric motor;

S3 comparing the signal of the operating variable with the model signal shape and ascertaining an assessment of correspondence from the comparison, the assessment of correspondence at least partially taking place on the basis of the threshold value of correspondence;

S4 detecting the progress of work at least partially on the basis of the assessment of correspondence ascertained in method step S3;

the providing of comparative information taking place at least partially on the basis of a learning process.

The method according to the disclosure effectively assists a user of the handheld power tool in achieving reproducibly high-quality application results. In particular, the method according to the disclosure makes it possible more easily and/or quickly for a user to achieve fully completed progress of work. In this case, the impact screwdriver learns independently or partially independently at which time it must react to the progression of the impact detection.

Some embodiments of the disclosure can be categorized as follows:
1. Embodiments in which the threshold value of correspondence is provided by a learning process in the sense of performing one or more example applications;
2. Embodiments in which the model signal is provided by a learning process in the sense of performing one or more example applications;
3. Embodiments in which the threshold value of correspondence and/or the model signal are provided by a learning process in the sense of learning one or more screw profiles. The reading in of a screw profile may be understood here as meaning in particular the reading in of a signal, given by way of example, of an operating variable of the electric motor by the handheld power tool. The screw profiles may for example be read in with the aid of a connection to the Internet and/or the user may itself create the same by carrying out example applications.

All of the embodiments have the fundamental advantage that it is possible to complete applications, such as for example successive screwing operations, quickly, reproducibly and in compliance with the user's requirements, while making work easier for the user.

For example, in the assembly of furniture, for instance kitchen furniture, many identical screws have to be screwed into a largely uniform material. Here it is important for the user that the screw heads are countersunk as uniformly as possible (in the sense of a consistently high quality of the work). The disclosure makes it possible to provide the user with assistance by which consistent quality of work is possible with the least possible effort. That is to say that it can be ensured that all of the screws are screwed in to a uniform depth, for example by automatically reducing or automatically stopping a motor speed of an impact screwdriver controlled by the method according to the disclosure.

A person skilled in the art will appreciate that the feature of the model signal shape includes a signal shape of a continuous progression of a working operation. In one embodiment, the model signal shape is a model signal shape typical of the state, which is typical of the state for specific progress of work of the handheld power tool. Examples of such progress of work comprise placing a screw head on a fastening substrate, the free turning of a loosened screw, the starting or stopping of a rotary impact mechanism of the handheld power tool, and/or impact of the rotary impact mechanism without further turning of the struck element or the tool holder.

The approach for detecting the progress of work by way of operating variables in the tool-internal measured variables, such as for example the speed of the electric motor, proves to be particularly advantageous since, with this method, the progress of work is made particularly reliably and largely independently of the general operating state of the tool or its application.

This involves substantially dispensing with sensor units, in particular additional sensor units, for sensing the tool-internal measured variables, such as for example an acceleration sensor unit, and so substantially the method according to the disclosure serves exclusively for detecting the progress of work.

As already mentioned at an earlier point, in certain embodiments of the disclosure the learning process comprises the performing of an example application on the part of the user and/or the reading in of at least one example application into a memory connected to the handheld tools or integrated into the handheld power tool. Reading in should be understood in this connection as meaning the reading in of one or more screw profiles, in particular of a signal, given by way of example, of an operating variable of the electric motor. The screw profiles may for example be read in with the aid of a connection to the Internet.

Here, the at least one example application may comprise achievement of a specified working state of the handheld power tool, for instance starting or stopping of impact operation, in particular of rotary impact operation, or achievement of a specific screwing-in depth of a connecting means to be screwed in with the handheld power tool.

In some embodiments of the disclosure, the threshold value of correspondence is at least partially provided on the basis of the learning process, and the learning process comprises the following method steps B1 providing at least one model signal shape, the model signal shape being assignable to progress of work of the handheld power tool;

B2 ascertaining a signal of an operating variable of the electric motor;

B3 comparing the signal of the operating variable with the model signal shape at a time when a speed of the electric motor is being reduced, in particular at a time when the handheld power tool is being stopped by the user, and ascertaining a threshold value of correspondence assigned to the example application.

Further embodiments include that in step B1 the at least one model signal shape is provided by the method according to the disclosure described above.

The method according to the disclosure may further comprise that the learning process includes the performing or reading in of at least two example applications, preferably a multiplicity of example applications, and that the learning process includes the ascertaining of an average value of the threshold value of correspondence from the two or more threshold values of correspondence assigned to the example applications.

In this way, irregularities encountered everywhere in the screwing operation, such as for instance variations in the substrate material, screwing-in angle, exertion of force by the user, and so on, are statistically averaged and consequently mitigated in their effect in the learning process.

It may further be provided according to the disclosure that the reading in of the at least one example application includes the reading in of a signal, given by way of example, of an operating variable of the electric motor by the handheld power tool. The specific progression of this signal, given by way of example, may also be referred to as the "screw profile". It has already been pointed out further above that the screw profiles may be read in for example with the aid of a connection to the Internet, and/or the user may itself create the screw profiles by carrying out example applications.

In some embodiments of the disclosure, the method comprises furthermore the method step of S5 performing a first routine of the handheld power tool at least partially on the basis of the progress of work detected in method step S4.

In these embodiments, the impact screwdriver reacts independently or partially independently to detection of the progress of work, for example the impact state.

By various routines it is possible to offer the user one or more system functionalities with which it can complete applications more easily and/or quickly. The learning process provided according to the disclosure makes the method highly adaptive and consequently it adapts itself to a great extent to the user's needs.

In one embodiment, the first routine comprises stopping the electric motor while taking into account at least one defined and/or predeterminable parameter, in particular a parameter predeterminable by a user of the handheld power tool. Examples of such a parameter comprise a time period, a number of revolutions of the electric motor, a number of revolutions of the tool holder, an angle of rotation of the electric motor and a number of impacts of the impact mechanism of the handheld power tool.

In a further embodiment, the first routine comprises a change, in particular a reduction and/or an increase, in a speed of the electric motor. Such a change in the speed of the electric motor may be achieved for example by means of a change in the motor current, the motor voltage, the rechargeable battery current, or the rechargeable battery voltage, or by a combination of these measures.

Preferably, an amplitude of the change in the speed of the electric motor is definable by a user of the handheld power tool. As an alternative or in addition to this, the change in the speed of the electric motor may also be predetermined by a target value. The term amplitude is intended in this connection also to be understood generally in the sense of a level of the change and not exclusively associated with cyclical processes.

In one embodiment, the change in the speed of the electric motor takes place multiply and/or dynamically, in particular staggered over time and/or along a characteristic curve of the change in speed and/or on the basis of the progress of work of the handheld power tool, the change in the speed being at least partially determined on the basis of the learning process on the basis of the example applications.

In principle, various operating variables may come into consideration as operating variables that are recorded by way of a suitable measured-value pickup. In this case it is particularly advantageous that, according to the disclosure, no additional sensor is necessary in this respect, since various sensors, such as for example for speed monitoring, preferably Hall sensors, are already installed in electric motors.

Advantageously, the operating variable is a speed of the electric motor or an operating variable correlating with the speed. The fixed transmission ratio of the electric motor to the impact mechanism results for example in a direct dependence of the motor speed on the impact frequency. A further conceivable operating variable correlating with the speed is the motor current. A motor voltage, a Hall signal of the motor, a battery current or a battery voltage are also conceivable as the operating variable of the electric motor, while an acceleration of the electric motor, an acceleration of a tool holder or a sound signal of an impact mechanism of the handheld power tool is also conceivable as the operating variable.

In some embodiments, the signal of the operating variable is recorded in method step S2 as a progression over time of measured values of the operating variable or as measured values of the operating variable as a variable of the electric motor correlating with the progression over time, for example an acceleration, a jerk, in particular of a higher order, a power output, an energy, an angle of rotation of the electric motor, an angle of rotation of the tool holder or a frequency.

In the last-mentioned embodiment, it may be ensured that a constant periodicity of the signal to be investigated is obtained independently of the motor speed.

If the signal of the operating variable is recorded in method step S2 as a progression over time of measured values of the operating variable, in a step S2a following method step S2 a transformation of the progression over time of the measured values of the operating variable into a progression of the measured values of the operating variable as a variable of the electric motor correlating with the progression over time takes place on the basis of a fixed transmission ratio of the gear mechanism. This in turn produces the same advantages as when directly recording the signal of the operating variable over time.

Preferably, progress of work of the first routine is output to a user of the handheld power tool by using an output device of the handheld power tool. Output by means of the output device may be understood as meaning in particular the display or documentation of the progress of work. Here, documentation may also be the evaluating and/or storing of instances of progress of work. This also comprises for example the storing of multiple screwing operations in a memory.

In one embodiment, the first routine and/or characteristic parameters of the first routine can be set and/or can be presented by a user by way of application software (an "app") or a user interface (a "Human-Machine Interface", "HMI").

Furthermore, in one embodiment the HMI may be arranged on the machine itself, whereas in other embodiments the HMI may be arranged on external devices, for example a smartphone, a tablet or a computer.

In one embodiment of the disclosure, the first routine comprises optical, acoustic and/or haptic feedback to a user.

Preferably, the model signal shape is a waveform, for instance a waveform about an average value, in particular a substantially trigonometric waveform. In this case, the model signal shape may for example represent ideal impact operation of the hammer on the anvil of the rotary impact mechanism, the ideal impact operation preferably being impact without further turning of the tool spindle of the handheld power tool.

In one embodiment of the disclosure, in method step S3 the signal of the operating variable is compared by means of a comparison method to establish whether at least one predetermined threshold value of correspondence is satisfied.

Preferably, the comparison method comprises at least a frequency-based comparison method and/or a comparative comparison method.

In this case, the decision whether progress of work to be detected has been identified in the signal of the operating variable can be taken at least partially by means of the frequency-based comparison method, in particular a bandpass filtering and/or a frequency analysis.

In one embodiment, the frequency-based comparison method comprises at least bandpass filtering and/or frequency analysis, the predetermined threshold value being at least 90%, in particular 95%, most particularly 98%, of a predetermined limit value.

In the bandpass filtering, for example the recorded signal of the operating variable is filtered by way of a bandpass, the pass band of which corresponds to the model signal shape. A corresponding amplitude in the resultant signal is to be expected when the decisive progress of work to be detected has been made. The predetermined threshold value of the bandpass filtering may therefore be at least 90%, in particular 95%, most particularly 98%, of the corresponding amplitude in the progress of work to be detected. The predetermined limit value here may be the corresponding amplitude in the resultant signal of ideal progress of work to be detected.

The known frequency-based comparison method of frequency analysis can be used to search in the recorded signals of the operating variable for the previously specified model signal shape, for example a frequency spectrum of the progress of work to be detected. In the recorded signals of the operating variable, a corresponding amplitude of the progress of work to be detected can be expected. The predetermined threshold value of the frequency analysis may be at least 90%, in particular 95%, most particularly 98%, of the corresponding amplitude in the progress of work to be expected. Here, the predetermined limit value may be the corresponding amplitude in the recorded signals of ideal progress of work to be detected. In this case, appropriate segmentation of the recorded signal of the operating variable may be necessary.

In one embodiment, the comparative comparison method comprises at least a parameter estimation and/or a cross-correlation, the predetermined threshold value being at least 40% of a correspondence of the signal of the operating variable to the model signal shape.

The measured signal of the operating variable may be compared with the model signal shape by means of the comparative comparison method. The measured signal of the operating variable is ascertained in such a way that it has substantially the same finite signal length as that of the model signal shape. The comparison of the model signal shape with the measured signal of the operating variable may in this case be output as a signal, in particular a discrete or continuous signal, of a finite length. Depending on a degree of correspondence or a deviation of the comparison, a result can be output, indicating whether the progress of work to be detected has been made. If the measured signal of the operating variable corresponds by at least 40% to the model signal shape, the progress of work to be detected may have been made. It is additionally conceivable that, by means of comparing the measured signal of the operating variable with the model signal shape, the comparing method may output a degree of comparison with one another as the result of the comparison. The comparison of at least 60% in relation to one another may be a criterion here for whether the progress of work to be detected has been made. It can be assumed here that the lower limit for correspondence is 40% and the upper limit for correspondence is 90%. Accordingly, the upper limit for the deviation is 60% and the lower limit for the deviation is 10%.

In the case of the parameter estimation, a comparison between the previously specified model signal shape and the signal of the operating variable can take place in an easy way. For this purpose, estimated parameters of the model signal shape may be identified in order to adapt the model signal shape to the measured signal of the operating variables. By means of a comparison between the estimated parameters of the previously specified model signal shape and a limit value, a result as to whether the progress of work to be detected has been made can be ascertained. There may subsequently be a further assessment of the result of the comparison as to whether the predetermined threshold value has been reached. This assessment may either be a quality determination of the estimated parameters or the correspondence between the specified model signal shape and the sensed signal of the operating variable.

In a further embodiment, method step S3 includes a step S3a of quality determination of the identification of the model signal shape in the signal of the operating variable, whereas in method step S4 the detecting of the progress of work takes place at least partially on the basis of the quality determination. An adaptation quality of the estimated parameters may be determined as a measure of the quality determination.

In method step S4, a decision as to whether the progress of work to be detected has been identified in the signal of the operating variable may be taken at least partially by means of the quality determination, in particular the measure of the quality.

In addition or as an alternative to the quality determination, method step S3a may comprise a comparative determination of the identification of the model signal shape and the signal of the operating variable. The comparison of the estimated parameters of the model signal shape with the measured signal of the operating variable may be for example 70%, in particular 60%, most particularly 50%. In method step S4, the decision as to whether the progress of work to be detected has been made is taken, at least partially on the basis of the comparative determination. The decision as to whether the progress of work to be detected has been made may take place with the predetermined threshold value of at least 40% correspondence of the measured signal of the operating variable and the model signal shape.

In the case of a cross-correlation, a comparison between the previously specified model signal shape and the measured signal of the operating variable may take place. In the case of the cross-correlation, the previously specified model signal shape may be correlated with the measured signal of the operating variable. In the case of a correlation of the model signal shape with the measured signal of the operating variable, a measure of correspondence of the two signals may be ascertained. The measure of correspondence may be for example 40%, in particular 50%, most particularly 60%.

In method step S4 of the method according to the disclosure, detecting the progress of work may at least partially take place on the basis of the cross-correlation of the model signal shape with the measured signal of the operating variable. Detecting may in this case at least partially take place on the basis of the predetermined threshold value of at least 40% correspondence of the measured signal of the operating variable and the model signal shape.

In one embodiment, the threshold value of correspondence can be specified by a user of the handheld power tool and/or is predefined at the factory.

In a further embodiment, the handheld power tool is an impact screwdriver, in particular a rotary impact screwdriver, and the progress of work is starting or stopping of impact operation, in particular rotary impact operation.

In one embodiment, the threshold value of correspondence can be selected by a user on the basis of a preselection of applications of the handheld power tool predefined at the factory. This may take place for example by way of a user interface, for instance an HMI (Human-Machine Interface), for instance a mobile device, in particular a smartphone and/or a tablet.

In particular, in method step S1 the model signal shape may be specified variably, in particular by a user. Here, the model signal shape is assigned to the progress of work to be detected, and so the user can predetermine the progress of work to be detected.

Advantageously, the model signal shape is predefined, in particular specified at the factory, in method step S1. In principle, it is conceivable that the model signal shape is stored or saved internally in the device; as an alternative and/or in addition, it is provided for the handheld power tool, in particular is provided by an external data device.

A person skilled in the art will appreciate that the method according to the disclosure makes it possible to detect the progress of work independently of at least a setpoint speed of the electric motor, at least a starting characteristic of the electric motor and/or at least a state of charge of energy supply, in particular a rechargeable battery, of the handheld power tool.

The signal of the operating variable should be understood here as a time sequence of measured values. As an alternative and/or in addition, the signal of the operating variable may also be a frequency spectrum. As an alternative and/or in addition, the signal of the operating variable may also be re-worked, such as for example smoothed, filtered, fitted and the like.

In a further embodiment, the signal of the operating variable is stored as a sequence of measured values in a memory, preferably a ring memory, in particular of the handheld power tool.

In one method step, the progress of work to be detected is identified on the basis of fewer than ten impacts of an impact mechanism of the handheld power tool, in particular fewer than ten impact oscillation periods of the electric motor, preferably fewer than six impacts of an impact mechanism of the handheld power tool, in particular fewer than six impact oscillation periods of the electric motor, most preferably fewer than four impacts of an impact mechanism, in particular fewer than four impact oscillation periods of the electric motor. Here, an axial, radial, tangential and/or circumferentially directed impact of the striker of an impact mechanism, in particular a hammer, on a body of the impact mechanism, in particular an anvil, is to be understood as an impact of the impact mechanism. The impact oscillation period of the electric motor is correlated with the operating variable of the electric motor. An impact oscillation period of the electric motor may be ascertained on the basis of operating variable fluctuations in the signal of the operating variable.

The disclosure also concerns a handheld power tool, having an electric motor, a measured-value pickup of an operating variable of the electric motor and a control unit, the handheld power tool advantageously being an impact screwdriver, in particular a rotary impact screwdriver, and the handheld power tool being designed for carrying out the method described above.

The electric motor of the handheld power tool sets an input spindle in rotation, and an output spindle is connected to the tool holder. An anvil is connected to the output spindle for conjoint rotation and a hammer is connected to the input spindle such that, as a result of the rotary movement of the input spindle, it performs an intermittent movement in the axial direction of the input spindle and an intermittent rotational movement about the input spindle, the hammer in this way intermittently striking the anvil and thus emitting an impact pulse and angular momentum to the anvil, and consequently to the output spindle. A first sensor transmits a first signal, for example for ascertaining an angle of rotation of the motor, to the control unit. Furthermore, a second sensor may transmit a second signal for ascertaining a motor speed to the control unit.

Advantageously, the handheld power tool has a memory unit, in which various values can be stored.

In a further embodiment, the handheld power tool is a battery-powered handheld power tool, in particular a battery-powered rotary impact screwdriver. This ensures flexible use, independent of the power grid, of the handheld power tool.

Advantageously, the handheld power tool is an impact screwdriver, in particular a rotary impact screwdriver, and the progress of work to be detected is the resting of a screw head on a fastening substrate, the free turning of a loosened screw, the starting or stopping of a rotary impact mechanism of the handheld power tool, and/or an impact of the rotary impact mechanism without further turning of the struck element or the tool holder.

The identification of the impacts of the impact mechanism of the handheld power tool, in particular the impact oscillation periods of the electric motor, can be achieved for example by using a fast-fitting algorithm, by means of which an evaluation of the impact detection within less than 100 ms, in particular less than 60 ms, most particularly less than 40 ms, can be made possible. Here, the mentioned inventive method makes it possible to detect progress of work substantially for all of the abovementioned applications and to screw loose and fixed fastening elements into the fastening substrate.

The present disclosure makes it possible to largely dispense with more complicated methods of signal processing, for example filters, signal loopbacks, system models (static and adaptive) and signal tracking.

In addition, these methods allow even quicker identification of impact operation and progress of work, with the result that an even quicker reaction of the tool can be brought about. This applies in particular for the number of past impacts after the starting of the impact mechanism up to the identification and also in particular operating situations, such as for example the start-up phase of the drive motor. In this case, it is also not necessary for restrictions of the functionality of the tool to be applied, for example reducing the maximum drive speed. Furthermore, the functioning of the algorithm is also independent of other influencing variables, such as for example the setpoint speed and the battery state of charge.

In principle, no further sensor systems (for example an acceleration sensor) are required, but these evaluation methods can nevertheless also be applied to signals of further sensor systems. Furthermore, in other motor concepts, which manage for example without sensing the speed, this method can also be used for other signals.

In a preferred embodiment, the handheld power tool is a battery screwdriver, a drill, an impact drill or a hammer drill, it being possible for a drill bit, a bit crown or various bit attachments to be used as the tool. The handheld power tool according to the disclosure is in particular in the form of an impact screwdriver, a higher peak torque for screwing in or unscrewing a screw or a screw nut being generated as a result of the pulsed release of the motor energy. Transmission of electrical energy should be understood in this connection as meaning in particular that the handheld power tool passes energy on to the body via a rechargeable battery and/or a power cable connection.

Moreover, depending on the chosen embodiment, the screwdriver may be designed to be flexible in terms of its direction of rotation. In this way, the proposed method can be used both for screwing in and for unscrewing a screw or a screw nut.

In the context of the present disclosure, "ascertain" is intended to include in particular measure or record, while "record" should be understood in the sense of measure and store, and in addition "ascertain" is also intended to include possible signal processing of a measured signal.

Furthermore, "decide" should also be understood as meaning detect, with a clear assignment being intended to be achieved. "Identify" should be understood as meaning detecting partial correspondence to a pattern, which can be made possible for example by fitting a signal to the pattern, a Fourier analysis or the like. "Partial correspondence" should be understood as meaning that the fitting is affected by an error which is less than a predefined threshold, in particular less than 30%, most particularly less than 20%.

Further features, application possibilities and advantages of the disclosure will become apparent from the following description of the exemplary embodiment of the disclosure, which is shown in the drawing. It should be noted here that the features described or shown in the figures, individually or in any desired combination, have only a descriptive character for the subject matter of the disclosure, regardless of how they are formulated and shown in the description and in the drawing, respectively, and are not intended to restrict the disclosure in any form.

BRIEF DESCRIPTION OF THE DRAWINGS

The disclosure is explained in more detail below on the basis of preferred exemplary embodiments. In the schematic drawings:

FIG. 2(a) shows progress of work of an example application and an assigned signal of an operating variable;

FIG. 2(b) shows a correspondence of the signal of the operating variable shown in FIG. 2(a) to a model signal;

FIG. 10(a) shows a signal of an operating variable;

FIG. 10(b) shows an amplitude function of a first frequency contained in the signal of FIG. 10(a);

FIG. 10(c) shows an amplitude function of a second frequency contained in the signal of FIG. 10(a);

FIG. 11 shows a joint representation of a signal of an operating variable and an output signal of a bandpass filtering, on the basis of a model signal;

FIG. 1 shows a handheld power tool 100 according to the disclosure, which has a housing 105 with a handle 115. According to the embodiment shown, to be supplied with power independently of the grid, the handheld power tool 100 can be mechanically and electrically connected to a battery pack 190. In FIG. 1, the handheld power tool 100 takes the form by way of example of a battery-powered rotary impact screwdriver. It is pointed out however that the present disclosure is not restricted to battery-powered rotary impact screwdrivers, but can be used in principle for handheld power tools 100 in which it is necessary to detect progress of work, such as for instance impact drills.

Figure 1:
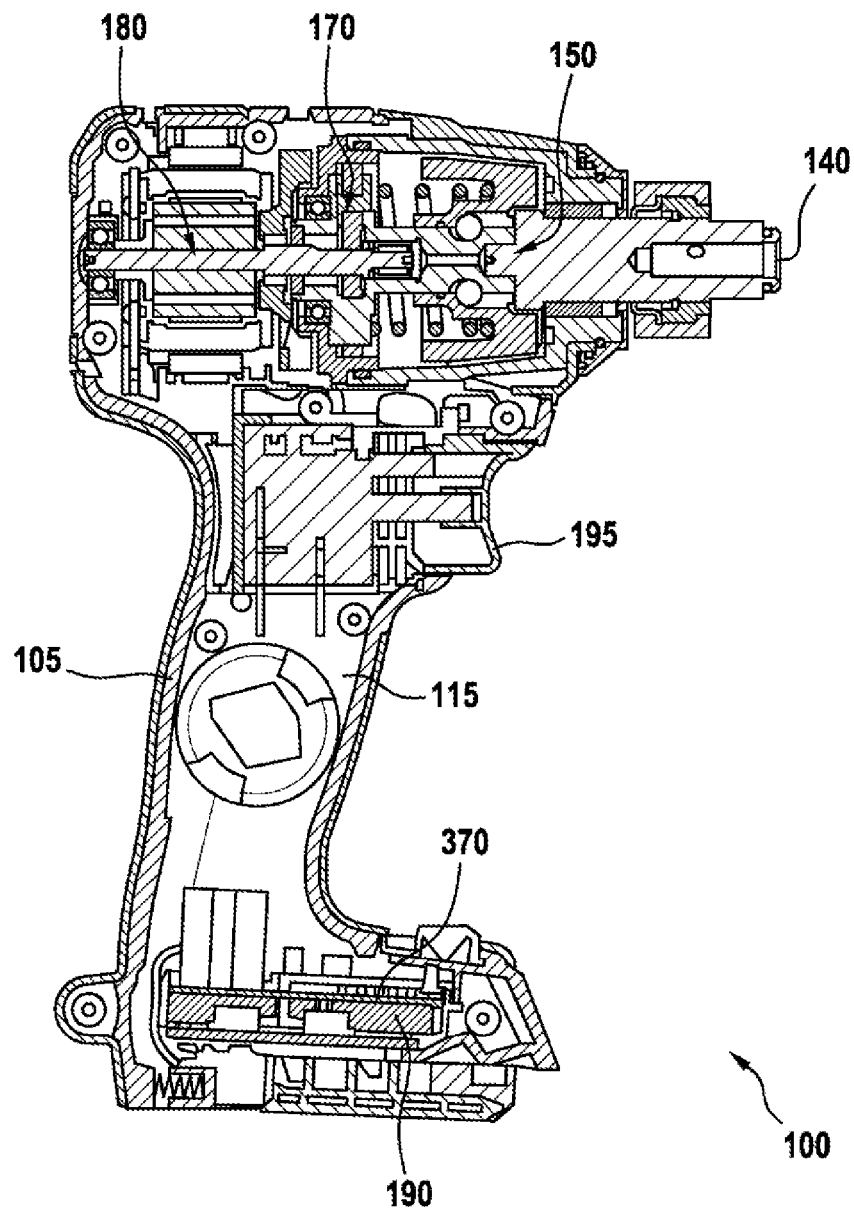
FIG. 1 shows a schematic representation of an electric handheld power tool.

Arranged in the housing 105 are an electric motor 180, supplied with power by the battery pack 190, and a gear mechanism 170. The electric motor 180 is connected to an input spindle via the gear mechanism 170. Furthermore, arranged within the housing 105 in the region of the battery pack 190 is a control unit 370, which, for the open-loop and/or closed-loop control of the electric motor 180 and the gear mechanism 170, acts on them for example by means of a set motor speed n, a selected angular momentum, a desired gear x or the like.

The electric motor 180 is actuable, i.e. can be switched on and off, for example via a manual switch 195, and may be any desired type of motor, for example an electronically commutated motor or a DC motor. In principle, the electric motor 180 is able to be subjected to electronic open-loop and/or closed-loop control in such a way that both reversing operation and specifications with regard to the desired motor speed n and the desired angular momentum are realizable. The manner of operation and the structure of a suitable electric motor are sufficiently well known from the prior art and so will not be described in detail here in order to keep the description concise.

Via an input spindle and an output spindle, a tool holder 140 is mounted rotatably in the housing 105. The tool holder 140 serves for receiving a tool and may be integrally formed directly on the output spindle or connected thereto in the form of an attachment.

The control unit 370 is in connection with a power source and is formed in such a way that it can subject the electric motor 180 to electronic open-loop and/or closed-loop control by means of various current signals. The various current signals provide different angular momentums of the electric motor 180, the current signals being passed to the electric motor 180 via a control line. The power source may be in the form for example of a battery or, as in the exemplary embodiment shown, in the form of a battery pack 190 or a connection to the grid.

Furthermore, operator control elements (not shown in detail) may be provided in order to set different operating modes and/or the direction of rotation of the electric motor 180.

According to one aspect of the disclosure, a method is provided for operating a handheld power tool 100, by means of which progress of work for example of the handheld power tool 100 shown in FIG. 1 can be established during use, for example a screwing-in or unscrewing operation, the providing of comparative information taking place at least partially on the basis of a learning process. "Providing" is understood in this connection as meaning making the corresponding feature available in an internal or external memory of the handheld power tool 100. Individual aspects of the learning process are presented in more detail further below.

As a consequence of establishing the progress of work, in embodiments of the disclosure corresponding reactions or routines on the part of the machine are initiated. As a result, reliably reproducible, high-quality screwing-in and unscrewing operations can be achieved. Aspects of the method are based, inter alia, on an investigation of signal shapes and a determination of a degree of correspondence of these signal shapes, which may for example correspond to an evaluation of further turning of an element, for instance a screw, driven by the handheld power tool 100.

FIG. 2 shows in this respect a signal, given by way of example, of an operating variable 200 of an electric motor 180 of a rotary impact screwdriver, as occurs in this or a similar form when a rotary impact screwdriver is used as intended. While the following statements relate to a rotary impact screwdriver, they also apply in the context of the disclosure analogously to other handheld power tools 100, such as for example impact drills.

In the present example of FIG. 2, time is plotted as a reference variable on the abscissa x. In an alternative embodiment, however, a variable correlated with time is plotted as a reference variable, such as for example the angle of rotation of the tool holder 140, the angle of rotation of the electric motor 180, an acceleration, a jerk, in particular a higher-order jerk, a power output or an energy. The motor speed n that applies at each time is plotted on the ordinate f(x) in the figure. Instead of the motor speed, it is also possible for some other operating variable that correlates with the motor speed to be chosen. In alternative embodiments of the disclosure, f(x) represents for example a signal of the motor current.

The motor speed and motor current are operating variables that are usually sensed without additional effort by a control unit 370 in handheld power tools 100. The ascertainment of the signal of an operating variable 200 of the electric motor 180 is designated as method step S2 in the context of the present disclosure. In preferred embodiments of the disclosure, a user of the handheld power tool 100 can select on the basis of which operating variable the inventive method is to be performed.

FIG. 2(*a*) shows an application involving a loose fastening element, for example a screw 900, in a fastening substrate 902, for example a wooden board. It can be seen in FIG. 2(*a*) that the signal comprises a first region 310, which is characterized by a monotonic increase in the motor speed, and by a region with a comparatively constant motor speed, which may also be referred to as a plateau. The intersection point between the abscissa x and ordinate f(x) in FIG. 2(*a*) corresponds in the screwdriving operation to the starting of the rotary impact screwdriver.

In the first region 310, the screw 900 encounters relatively little resistance in the fastening substrate 902, and the torque required for screwing it in lies below the disengagement torque of the rotary impact mechanism. The progression of the motor speed in the first region 310 thus corresponds to the operating state of screwdriving without impact.

As is apparent from FIG. 2(*a*), in the region 322 the head of the screw 900 is not resting on the fastening substrate 902, which means that the screw 900 driven by the rotary impact screwdriver is turned further with each impact. This additional angle of rotation may become smaller as the working process continues, which is reflected in the figure by a decreasing period duration. Moreover, further screwing in may also be indicated by a speed that decreases on average.

If the head of the screw 900 subsequently reaches the substrate 902, an even higher torque, and consequently more impact energy, is required for further screwing in. Since, however, the handheld power tool 100 does not supply any more impact energy, the screw 900 no longer turns further or only by a significantly smaller angle of rotation.

The rotary impact operation performed in the second region 322 and third region 324 is characterized by an oscillating progression of the signal of the operating variable 200, it being possible for the form of the oscillation to be for example trigonometrically or otherwise oscillating. In the present case, the oscillation has a progression that can be referred to as a modified trigonometric function. This characteristic shape of the signal of the operating variable 200 in impact screwdriving operation arises on account of the priming and releasing of the impact mechanism striker and the system chain, including of the gear mechanism 170, located between the impact mechanism and the electric motor 180.

The signal shapes assigned to individual instances of progress of work, for example impact operation, are therefore characterized in principle by specific characteristic features which are at least partially predetermined by the inherent properties of the rotary impact screwdriver. In the method according to the disclosure, starting from this finding, comparative information is provided in a step S1, with at least one model signal shape 240 being provided in a step S1a. The model signal shape 240 is assignable here to progress of work, for example achieving the resting of the head of the screw 900 on the fastening substrate 902, and the model signal shape 240 is also referred to in connection with some embodiments of the disclosure as a state-typical model signal shape. In other words, the model signal shape 240 contains typical features for the progress of work, such as the presence of a waveform, oscillation frequencies or amplitudes, or individual signal sequences in a continuous, quasi-continuous or discrete form.

In other applications, the progress of work to be detected may be characterized by other signal shapes than by oscillations, for instance by discontinuities or growth rates in the function f(x). In such cases, the state-typical model signal shape is characterized by these very parameters instead of by oscillations.

It should already be noted at this point that further comparative information is provided in a method step S1b, to be specific a threshold value of correspondence, which is described in more detail further below.

In a preferred refinement of the inventive method, in method step S1 the state-typical model signal shape 240 may be specified by a user. The state-typical model signal shape 240 may likewise be stored or saved internally in the device. In an alternative embodiment, the state-typical model signal shape may alternatively and/or additionally be provided for the handheld power tool 100, for example by an external data device.

In a method step S3 of the method according to the disclosure, the signal of the operating variable 200 of the electric motor 180 is compared with the state-typical model signal shape 240. The feature "compare" should be understood to have a broad meaning in the context of the present disclosure and be interpreted in the sense of signal analysis, and so a result of the comparison may in particular also be a partial or gradual correspondence of the signal of the operating variable 200 of the electric motor 180 to the model signal shape 240, it being possible for the degree of correspondence of the two signals to be ascertained by different mathematical methods, which will be referred to again later.

In step S3, an assessment of correspondence of the signal of the operating variable 200 of the electric motor 180 to the state-typical model signal shape 240 is also ascertained from the comparison and thus a statement can be made about the correspondence of the two signals.

FIG. 2(b) shows a progression of a function q(x) of an assessment of correspondence 201 that corresponds to the signal of the operating variable 200 in FIG. 2(a) and indicates at each point on the abscissa x a value of the correspondence between the signal of the operating variable 200 of the electric motor 180 and the state-typical model signal shape 240.

In the present example of the screwing in of the screw 900, this assessment is used to determine the amount of further turning when there is impact. The model signal shape 240 provided in step S1a corresponds in the example to ideal impact without further turning, meaning the state in which the head of the screw 900 rests on the surface of the fastening substrate 902, as shown in the region 324 of FIG. 2(a). Accordingly, in region 324 there is great correspondence between the two signals, which is reflected by a constantly high value of the function q(x) of the assessment of correspondence 201. By contrast, in the region 310, in which each impact is accompanied by great angles of rotation of the screw 900, only small correspondence values are achieved. The less the screw 900 turns further when there is impact, the greater this correspondence, which is discernible from the fact that the function q(x) of the assessment of correspondence 201 already reproduces continuously increasing correspondence values when the impact mechanism starts in the region 322, which is characterized by an angle of rotation of the screw 200 that becomes continuously smaller with each impact on account of the increasing screw-in resistance.

As is evident in the example of FIG. 2, the assessment of correspondence 201 of the signals for impact differentiation is well suited for this on account of the more or less sudden manifestation, this sudden change being caused by the likewise more or less sudden change in the angle of further turning of the screw 900 when completing the exemplary working process. According to the disclosure, detecting the progress of work will at least partially take place on the basis of a comparison of the assessment of correspondence 201 with the threshold value of correspondence provided in step S1a, which is characterized in FIG. 2(b) by a dashed line 202. In the present example of FIG. 2(b), the intersection point SP of the function q(x) of the assessment of correspondence 201 with the line 202 is assigned to the progress of work of the resting of the head of the screw 900 on the surface of the fastening substrate 902.

In a method step S4 of the method according to the disclosure, the progress of work is then at least partially detected on the basis of the assessment of correspondence 201 ascertained in method step S3.

As already stated further above, according to the disclosure, providing comparative information in step S1 takes place at least partially on the basis of a learning process. The learning process includes in embodiments of the disclosure the performing or reading in of at least one example application of the handheld power tool 100, the at least one example application comprising achievement of specified progress of work of the handheld power tool 100, for example achievement of the state in which the head of the screw 900 is resting on the surface of the fastening substrate 902, as shown in a region 324 of FIG. 2(a).

In some embodiments, the model signal 240 is provided by the learning process, the learning process comprising the following method steps A1 ascertaining a signal of an operating variable 200' of the electric motor 180 on the basis of the example application;

A2 determining a model signal shape 240', assigned to the example application, on the basis of the signal of the operating variable 200' while achieving, in particular at the time of achieving, the specified progress of work;

A2' determining a model signal shape 240', assigned to the example application, on the basis of the signal of the operating variable 200', as it is at the time of achieving the specified progress of work.

Advantageously, the learning process may include the performing or reading in of at least two example applications and the ascertaining of the model signal shape 240 from the two or more model signal shapes 240' assigned to the example applications, for example by averaging or some other statistical operation. The model signal shape 240 thus ascertained is stored, for example internally in the device, and in following applications is provided in the course of the method according to the disclosure in step S1a described above.

The basis of this embodiment is therefore that of learning applications. In simplified terms, the user performs one or more applications by way of example, and the handheld power tool 100 thereby notes the model signal shape 240' with which the user stops the handheld power tool 100 or reduces the speed. In subsequent applications, the handheld power tool 100 automatically stops or reduces the speed when the threshold value of correspondence that has been specified at the factory or on the part of the user or has likewise been learned on the part of the tool is reached in the assessment of correspondence of step S3. In this case, the speed progression could also be learned with the aid of the example applications in the sense of the routine to be performed when the progress of work to be detected is achieved.

By changing the model signal 240, with screwing remaining the same, great correspondence between the measured signal of the operating variable 200 and the model signal 240 is detected and, when the fixed threshold value of correspondence is reached, the handheld power tool 100 can perform a specified routine or a routine to be selected by the user, which is described still more precisely at a later point.

In a further embodiment, not the model signal 240 but the threshold value of correspondence is at least partially provided on the basis of the learning process, the learning process comprising the following method steps B1 providing at least one model signal shape 240", the model signal shape 240" being assignable to progress of work of the handheld power tool 100;

B2 ascertaining a signal of an operating variable 200' of the electric motor 180;

B3 comparing the signal of the operating variable 200' with the model signal shape 240" at a time when a speed of the electric motor 180 is being reduced, in particular at a time when the handheld power tool 100 is being stopped by the user, and ascertaining a threshold value of correspondence assigned to the example application.

Preferably, in step B1 the at least one model signal shape is provided by one of the methods described further above, that is to say once again by a learning process.

Advantageously, in the embodiments in which the threshold value of correspondence is provided on the basis of a learning process, the learning process involves the performing or reading in of at least two example applications, and the learning process comprises the ascertaining of an average value of the threshold value of correspondence from the two or more threshold values of correspondence assigned to the example applications, the term "average value" at this point standing in simplified terms for a suitable statistical processing of the at least two example applications.

In simplified terms, in this embodiment the user carries out one or more applications by way of example, and the handheld power tool 100 thereby notes the threshold value at which the user stops the handheld power tool 100 or reduces the speed. In subsequent applications, the handheld power tool 100 automatically stops or reduces the speed at the stored or calculated average value. In this case, the speed progression could also be learned with the aid of the example applications.

In the two embodiments described above, in which either the model signal shape 240 or the threshold value of correspondence is ascertained from example applications, it may be provided in a practical aspect that the learning process is initialized by selection of a learning mode of the handheld power tool 100.

In a further embodiment, the reading in of the at least one example application comprises the reading in of a signal, given by way of example, of an operating variable of the electric motor 180 by the handheld power tool 100. As already mentioned above, both the threshold value of correspondence and the model signal, or both, may be provided by a learning process in the sense of reading in one or more screw profiles. The reading in of a screw profile may be understood here as meaning in particular the reading in of a signal, given by way of example, of an operating variable of the electric motor by the handheld power tool. The screw profiles may for example be read in with the aid of a connection to the Internet and/or the user may itself create the same by carrying out example applications.

According to the disclosure, therefore, by differentiating or comparing signal shapes, an assessment of progress of work of an element driven by a rotary impact screwdriver and initiation of a routine following the progress of work may be performed, with either specific signal shapes that are used here, to be specific the model signal shape 240, or part of the assessment criterion for the correspondence of the compared signal shapes, to be specific the threshold value of correspondence, or both, being at least partially made available by a learning process.

Advantageously, the specifying of the progress of work learned in the sense of the above statements is supplemented by a further method step S5, in which a first routine of the handheld power tool 100 is at least partially performed on the basis of the progress of work detected in method step S4, as explained below. It is in this case respectively assumed that the progress of work to be detected as a consequence of which the handheld power tool performs the aforementioned first routine in method step S5 has been defined by a learning process as described above, by the parameters of model signal shape 240 and/or threshold value of correspondence.

In spite of the resultant reduction in the speed when changing the operating state to impact operation, in the case of small wood screws or self-tapping screws for example it is only possible with great difficulty to stop the screw head from penetrating into the material. The reason for this is that the impacts of the impact mechanism cause a high spindle speed, also with an increasing torque.

Figure 3:
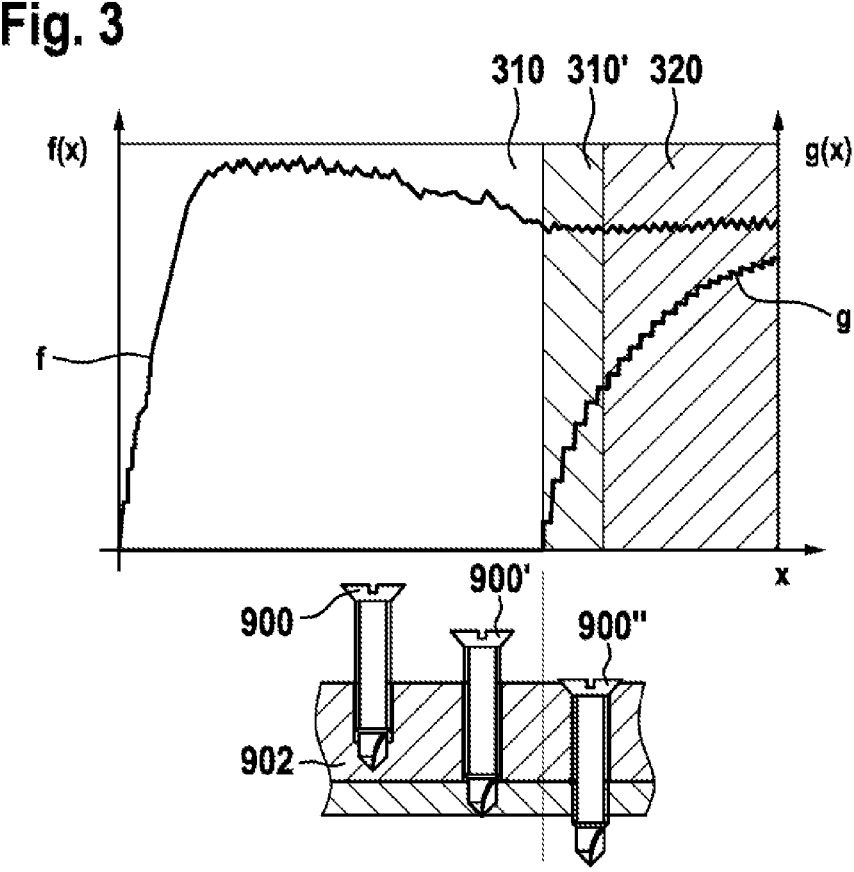
FIG. 3 shows progress of work of an example application and two assigned signals of operating variables.

This behavior is shown in FIG. 3. As in FIG. 2, time is plotted for example on the abscissa x, while a motor speed is plotted on the ordinate f(x) and the torque g(x) is plotted on the ordinate g(x). The graphs f and g accordingly indicate the progressions over time of the motor speed f and the torque g. In the lower region of FIG. 3, again in a way similar to the representation of FIG. 2, various states in a screwing-in operation of a wood screw 900, 900' and 900" into a fastening substrate 902 are schematically shown.

In the "no-impact" operating state, which is shown in the figure by the reference numeral 310, the screw turns with high speed f and low torque g. In the "impact" operating state, indicated by the reference numeral 320, the torque g increases quickly, while the speed f only drops slowly, as already noted further above. The region 310' in FIG. 3 identifies the region within which the impact detection explained in connection with FIG. 2 takes place.

In order for example to prevent a screw head of the screw 900 from penetrating into the fastening substrate 902, according to the disclosure an application-related, appropriate routine or reaction of the tool is performed in method step S5 at least partially on the basis of the progress of work detected in method step S4, for instance switching off of the machine, changing the speed of the electric motor 180 and/or giving optical, acoustic and/or haptic feedback to the user of the handheld power tool 100.

In one embodiment of the disclosure, the first routine comprises stopping the electric motor 180 while taking into account at least one defined and/or predeterminable parameter, in particular a parameter predeterminable by a user of the handheld power tool.

Figure 4:
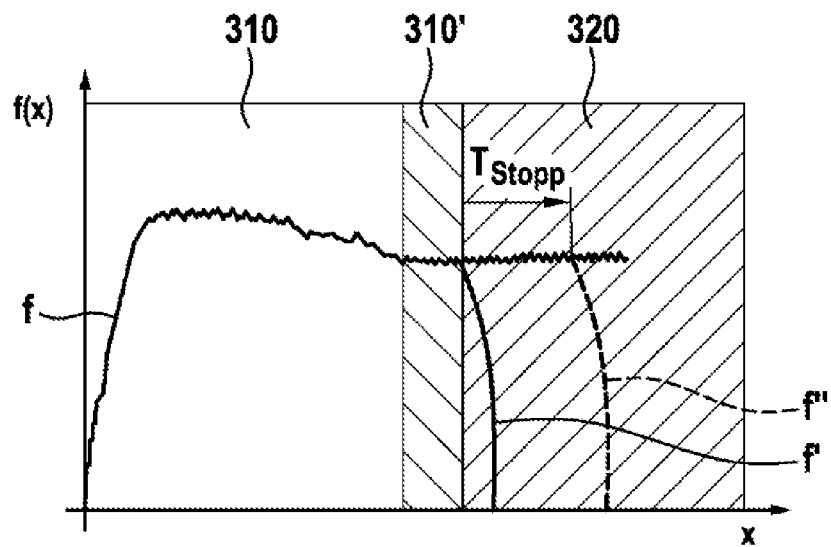
FIG. 4 shows progressions of signals of an operating variable according to two embodiments of the disclosure.

By way of example of this, FIG. 4 schematically shows stopping of the device immediately after impact detection 310', whereby the user is assisted in avoiding penetration of the screw head into the fastening substrate 902. This is shown in the figure by the rapidly descending branch f' of the graph f after the region 310'.

An example of a defined and/or predeterminable parameter, in particular a parameter predeterminable by a user of the handheld power tool 100, is a time defined by the user after which the device stops, which is shown in FIG. 4 by the time period $T_{Stopp}$ and the associated branch f'' of the graph f. In the ideal case, the handheld power tool 100 stops in just such a way that the screw head is flush with the screw resting surface. Since the time until this occurs is different however from application to application, it is of advantage if the time period $T_{Stopp}$ is definable by the user.

Figure 5:
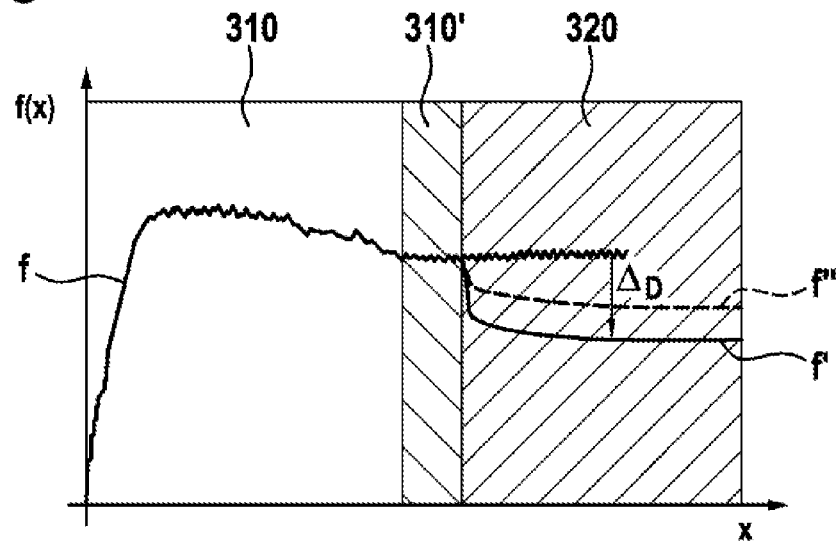
FIG. 5 shows progressions of signals of an operating variable according to two embodiments of the disclosure.

As an alternative to this or in addition, in one embodiment of the disclosure it is provided that the first routine comprises a change, in particular a reduction and/or an increase, in a speed, in particular a setpoint speed, of the electric motor 180, and consequently also the spindle speed, after impact detection. The embodiment in which a reduction of the speed is carried out is shown in FIG. 5. Again, the handheld power tool 100 is first operated in the "no-impact" operating state 310, which is identified by the progression of the motor speed represented by the graph f. Once impact detection has taken place in the region 310', the motor speed in the example is reduced by a specific amplitude, which is represented by the graphs f' and f''.

In one embodiment of the disclosure, the amplitude or amount of the change in the speed of the electric motor 180, identified for the branch f" of the graph f in FIG. 5 by $\Delta_D$, can be set by the user. The lowering of the speed has the effect that the user has more time to react when the screw head approaches the surface of the fastening substrate 902. As soon as the user is of the view that the screw head lies flush enough with the resting surface, it can stop the handheld power tool 100 with the aid of the switch. In comparison with stopping the handheld power tool 100 after impact detection, the change in the motor speed, in the example of FIG. 5 a reduction, has the advantage that this routine is largely independent of the application as a result of the user-determined shutdown.

In one embodiment of the disclosure, the amplitude $\Delta_D$ of the change in the speed of the electric motor 180 and/or a target value of the speed of the electric motor 180 is definable by a user of the handheld power tool 100, which further increases the flexibility of this routine in the sense of applicability for different applications.

In embodiments of the disclosure, the change in the speed of the electric motor 180 takes place multiply and/or dynamically. In particular, it may be provided that the change in the speed of the electric motor 180 takes place staggered over time and/or along a characteristic curve of the change in speed and/or in dependence on the progress of work of the handheld power tool 100.

Examples of this comprise inter alia combinations of a reduction in speed and an increase in speed. Furthermore, different routines or combinations thereof may be carried out at offset times for impact detection. Furthermore, the disclosure also comprises embodiments in which a time offset is provided between two or more routines. If for example the motor speed is reduced directly after impact detection, the motor speed may also be increased again after a specific time value. Furthermore, embodiments in which not only different routines themselves but also the time offset between the routines are predetermined by a characteristic curve are provided.

Figure 6:
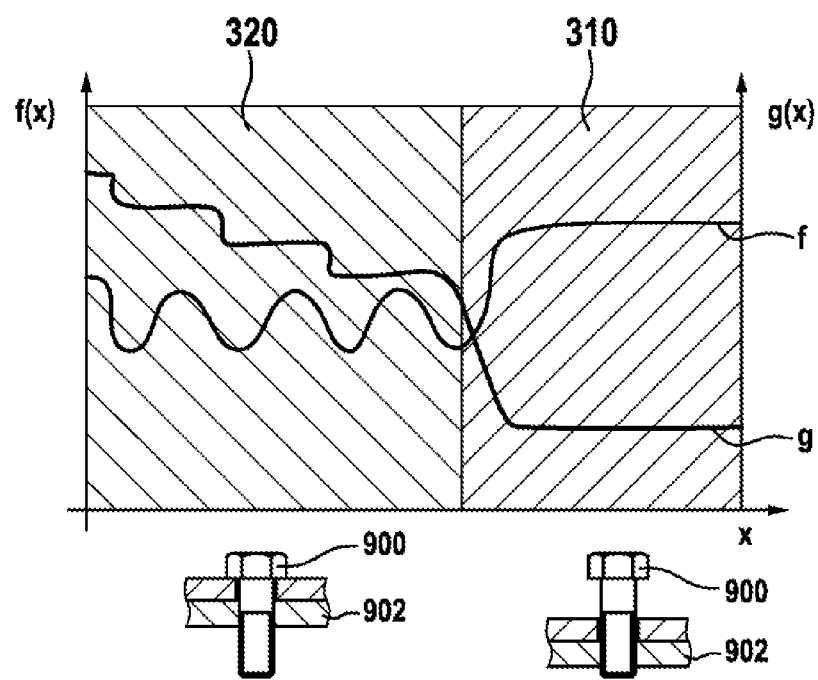
FIG. 6 shows progress of work of an example application and two assigned signals of operating variables.

As mentioned at the beginning, the disclosure comprises embodiments in which the progress of work is indicated by a change from the "impact" operating state in a region 320 to the "no-impact" operating state in a region 310, which is illustrated in FIG. 6.

Such a changeover of the operating states of the handheld power tool occurs for example when there is progress of work such that a screw 900 comes away from a fastening substrate 902, that is to say in an unscrewing operation, which is schematically shown in the lower region of FIG. 6. As also in FIG. 3, in FIG. 6 the graph f represents the speed of the electric motor 180 and the graph g represents the torque.

As already explained in connection with other embodiments of the disclosure, here too the operating state of the handheld power tool, in the present case the operating state of the impact mechanism, is sensed by finding characteristic signal shapes.

In the "impact" operating state, in FIG. 6 therefore in the region 320, the screw 900 does not turn and there is a high torque g. In other words, in this state the spindle speed is equal to zero. In the "no-impact" operating state, in FIG. 6 therefore in the region 310, the torque g quickly drops, which in turn provides a similarly quick increase in the spindle and motor speed f. This rapid increase in the motor speed f, caused by the dropping of the torque g from the time at which the screw 900 comes away from the fastening substrate 902, often makes it difficult for the user to intercept the screw 900 or screw nut coming away and stop it from falling down.

The method according to the disclosure may be used to prevent a threaded means, which may be a screw 900 or a nut, from being unscrewed so quickly after coming away from the fastening substrate 902 that it falls down. In this respect, reference is made to FIG. 7. With respect to the axes and graphs shown, FIG. 7 substantially corresponds to FIG. 6, and corresponding reference signs indicate corresponding features.

Figure 7:
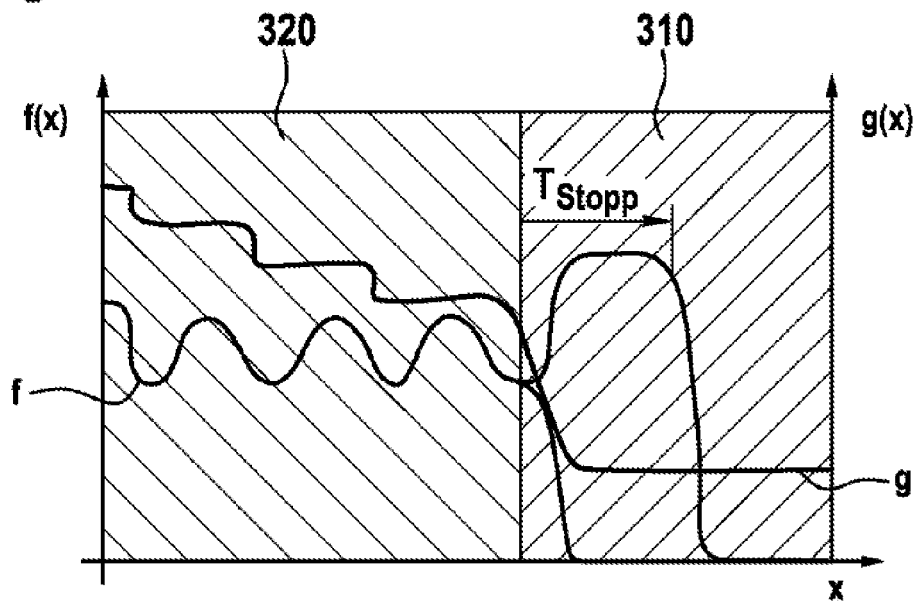
FIG. 7 shows progressions of signals of two operating variables according to two embodiments of the disclosure.

In one embodiment, the routine comprises in step S5 stopping of the handheld power tool 100 immediately after it is established that the handheld power tool 100 detects the progress of work to be detected, in the example the "no-impact" operating mode, which is shown in FIG. 7 by a steeply descending branch f' of the graph f of the motor speed in the region 310. In alternative embodiments, a time $T_{Stopp}$ after which the device stops may be defined by the user. In the figure this is represented by the branch f" of the graph f of the motor speed. A person skilled in the art will appreciate that, as also shown in FIG. 6, after the transition from the region 320 ("impact" operating state) into the region 310 ("no-impact" operating state), the motor speed initially increases quickly and, after elapse of the time period $T_{Stopp}$, it drops steeply.

With suitable choice of the time period $T_{Stopp}$, it is possible that the motor speed drops to "zero" just when the screw 900 or the nut is still just in the thread. In this case, the user can remove the screw 900 or the nut by a few turns of the thread, or alternatively leave it in the thread, in order for example to open a clamp.

Figure 8:
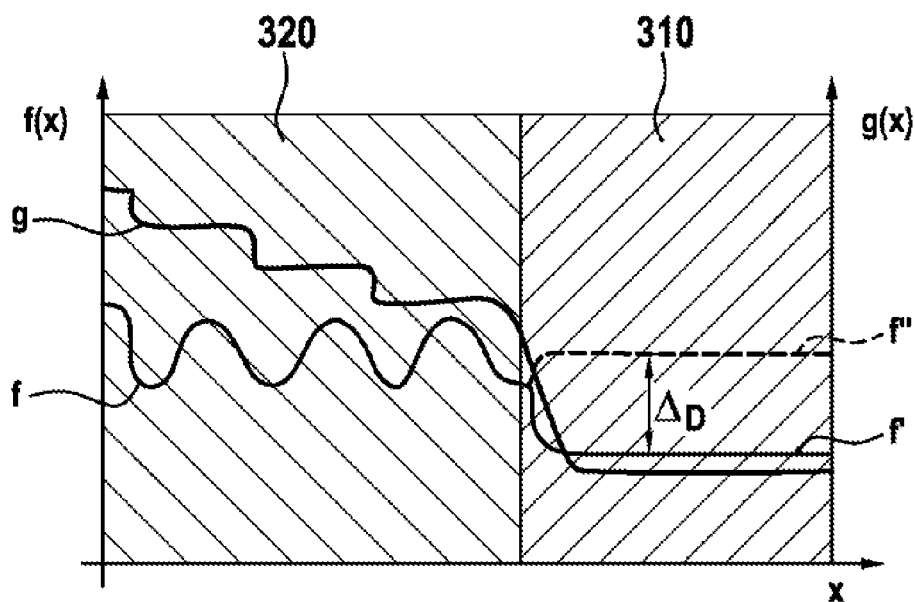
FIG. 8 shows progressions of signals of two operating variables according to two embodiments of the disclosure.

A further embodiment of the disclosure is described below on the basis of FIG. 8. In this case, after the transition from the region 320 ("impact" operating state) into the region 310 ("no-impact" operating state), a reduction in the motor speed takes place. The amplitude or amount of the reduction is specified in the figure with $\Delta_D$ as a measure between an average value f''' of the motor speed in the region 320 and the lowered motor speed f'. In certain embodiments, this lowering can be set by the user, in particular by specifying a target value of the speed of the handheld power tool 100, which in FIG. 8 lies at the level of the branch f'.

The lowering of the motor speed, and consequently also the spindle speed, has the effect that the user has more time to react when the head of the screw 900 comes away from the screw resting surface. As soon as the user is of the view that the screw head or the nut has been screwed in far enough, it can stop the handheld power tool 100 with the aid of the switch.

In comparison with the embodiments described in connection with FIG. 7, in which the handheld power tool 100 is stopped immediately or with a delay after the transition from the region 320 ("impact" operating state) into the region 310 ("no-impact" operating state), the speed reduction has the advantage of greater independence from the application, since it is ultimately the user who determines when the handheld power tool is switched off after the speed reduction. This may be helpful for example in the case of long threaded rods. Here there are applications in which, after loosening of the threaded rod and the accompanying stopping of the impact mechanism, an unscrewing process of varying duration still has to be carried out. Switching off the handheld power tool 100 after stopping the impact mechanism would therefore not be appropriate in these cases.

It should be mentioned that, in some embodiments of the disclosure, it is provided that also the parameters of the first routine used in method step S5, as described above, for example the progression and amplitude of a speed reduction or increase, may be defined by a learning process on the basis of example applications and/or screw profiles.

In some embodiments of the disclosure, progress of work is output to a user of the handheld power tool by using an output device of the handheld power tool.

A number of technical relationships and embodiments concerning carrying out method steps S1-S4 are explained below.

In practical applications it may be provided that method steps S2 and S3 are carried out repetitively during the operation of a handheld power tool 100, in order to monitor the progress of work of the application performed. For this purpose, in method step S2 a segmentation of the ascertained signal of the operating variable 200 may take place, and so method steps S2 and S3 are carried out on signal segments, preferably always of an identical, fixed length.

For this purpose, the signal of the operating variable 200 may be stored as a sequence of measured values in a memory, preferably a ring memory. In this embodiment, the handheld power tool 100 comprises the memory, preferably the ring memory.

As already mentioned in connection with FIG. 2, in preferred embodiments of the disclosure, in method step S2 the signal of the operating variable 200 is ascertained as a progression over time of measured values of the operating variable, or as measured values of the operating variable as a variable of the electric motor 180 correlating with the progression over time. In this case, the measured values may be discrete, quasi continuous or continuous.

One embodiment provides that the signal of the operating variable 200 is recorded in method step S2 as a progression over time of measured values of the operating variable and in a method step S2a following method step S2 a transformation of the progression over time of the measured values of the operating variable into a progression of the measured values of the operating variable as a variable of the electric motor 180 correlating with the progression over time takes place, such as for example the angle of rotation of the tool holder 140, the angle of rotation of the motor, an acceleration, a jerk, in particular a higher-order jerk, a power output or an energy.

Figure 9A:
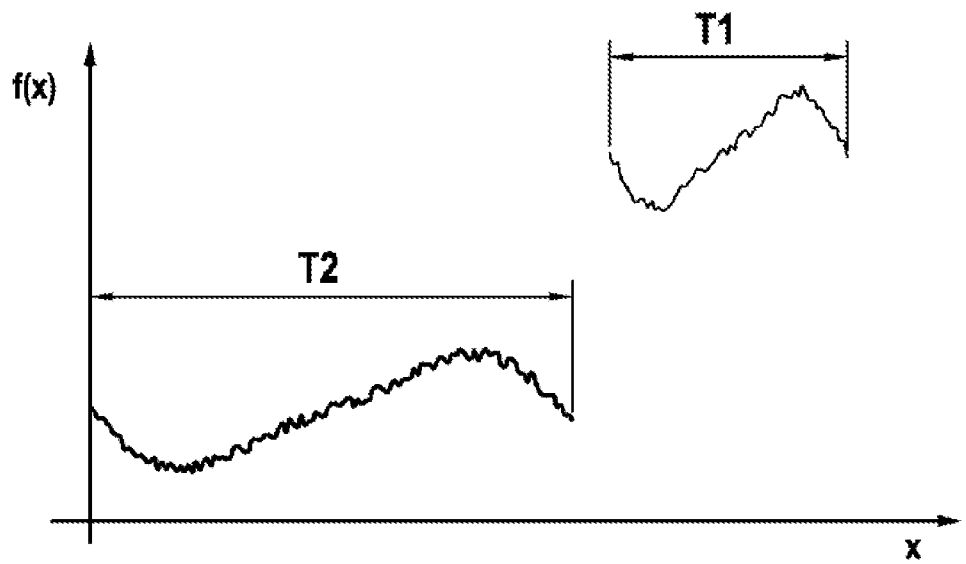
FIG. 9 shows a schematic representation of two different recordings of the signal of the operating variable.
Figure 9B:
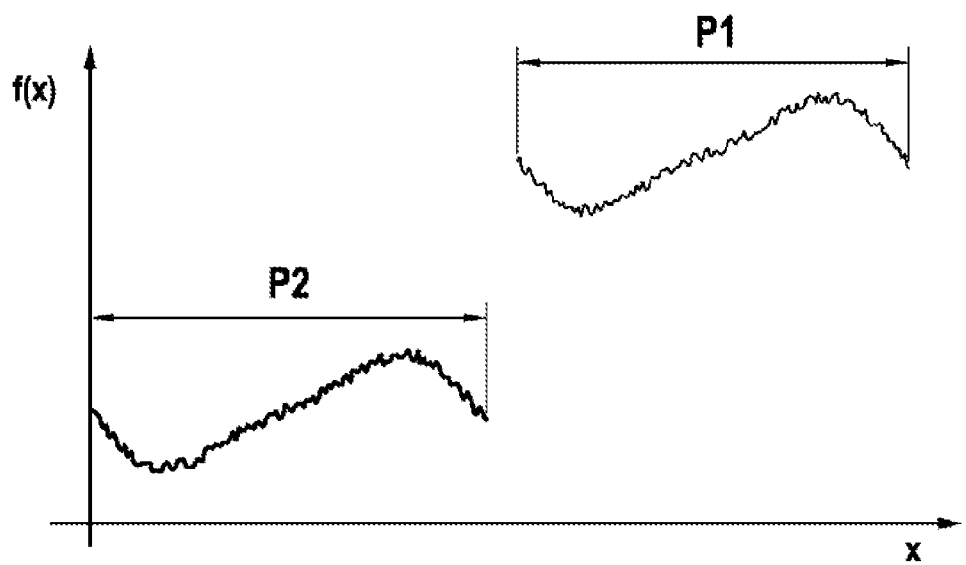
Figure 12A:
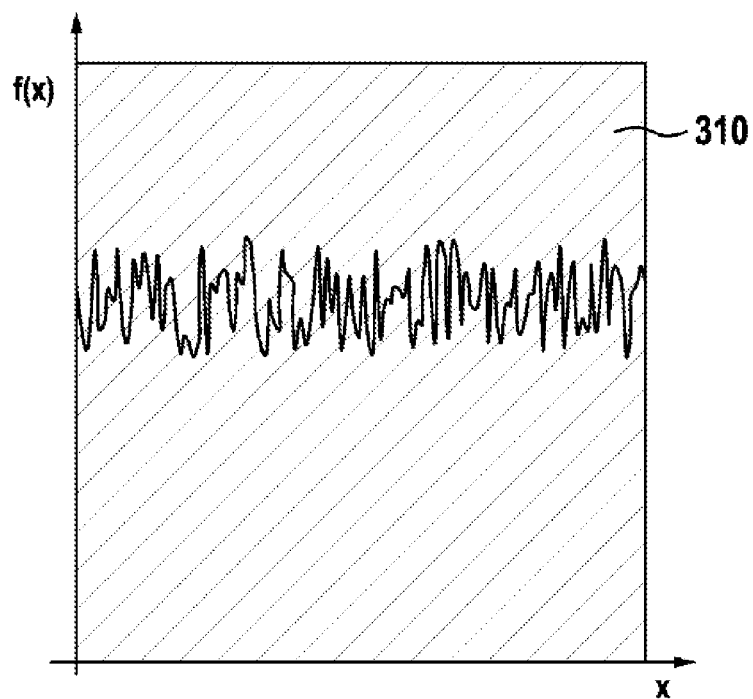
FIG. 12 shows a joint representation of a signal of an operating variable and an output of a frequency analysis, on the basis of a model signal.
Figure 12B:
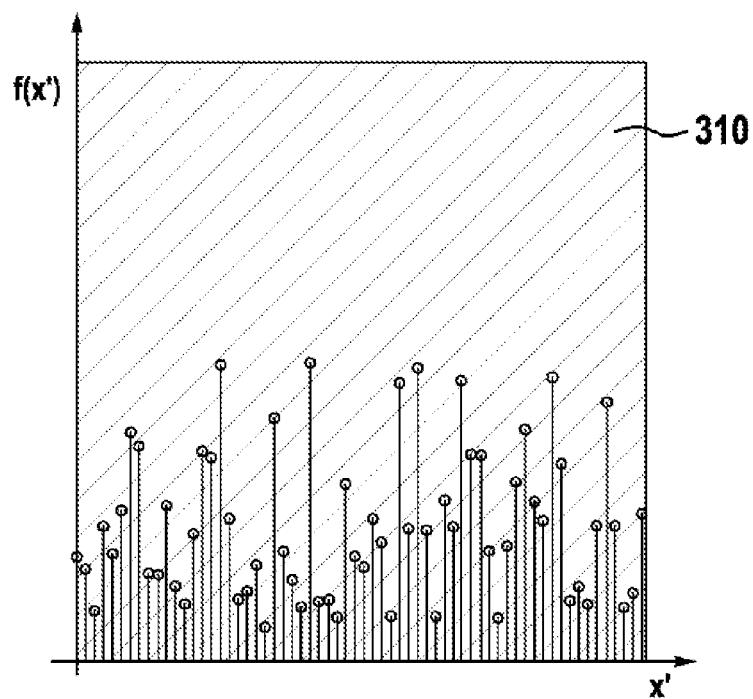
Figure 12C:
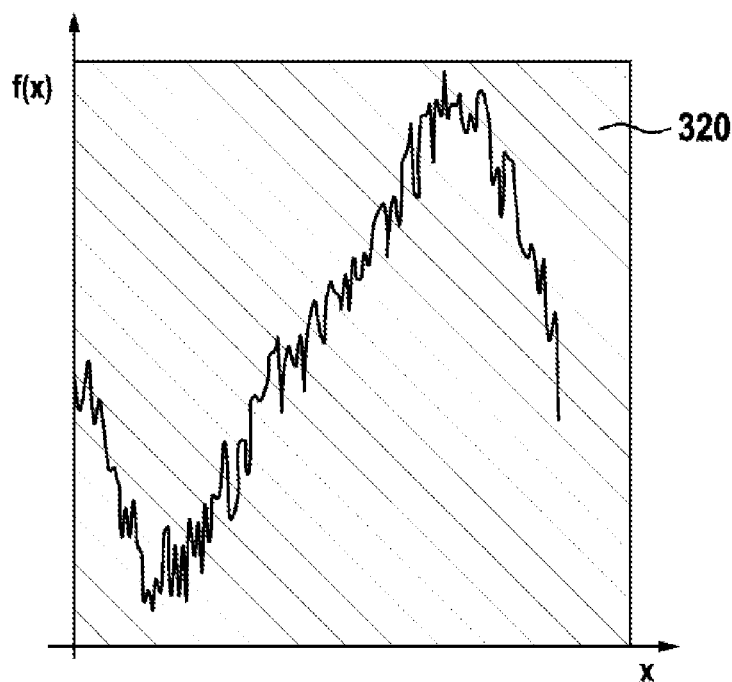
Figure 12D:
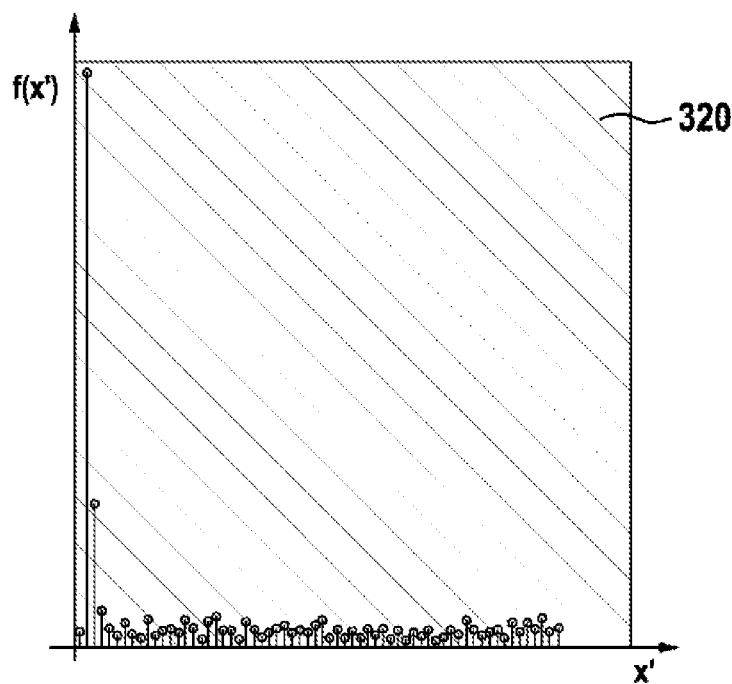

The advantages of this embodiment are described below on the basis of FIG. 9. In a way similar to FIG. 2, FIG. 9*a* shows signals f(x) of an operating variable 200 over an abscissa x, in this case over time t. As in FIG. 2, the operating variable may be a motor speed or a parameter correlating with the motor speed.

The figure contains two signal progressions of the operating variable 200, which can be respectively assigned to progress of work, thus for example the rotary impact screwing mode in the case of a rotary impact screwdriver. In both cases, the signal comprises a wavelength of a waveform assumed to be sinusoidal under ideal conditions, the signal with a shorter wavelength, T1, having a progression with a higher impact frequency, and the signal with a longer wavelength, T2, having a progression with a lower impact frequency.

Both signals can be generated with the same handheld power tool 100 at different motor speeds and are dependent, inter alia, on the speed of rotation that the user requests via the operating switch of the handheld power tool 100.

If for example the parameter "wavelength" is now to be used for the definition of the state-typical model signal shape 240, at least two different wavelengths T1 and T2 would therefore have to be stored in the present case as possible parts of the state-typical model signal shape, in order that the comparison of the signal of the operating variable 200 with the state-typical model signal shape 240 leads in both cases to the result of a "correspondence". Since the motor speed can change generally and significantly over time, this has the effect that the wavelength sought also varies, and as a result the methods for detecting this impact frequency would accordingly have to be set adaptively.

With a large number of possible wavelengths, the complexity of the method and of the programming would accordingly increase quickly.

Therefore, in the preferred embodiment the time values of the abscissa are transformed into values correlating with the time values, for example acceleration values, higher-order jerk values, output values, energy values, frequency values, rotational angle values of the tool holder 140 or rotational angle values of the electric motor 180. This is possible because the fixed transmission ratio of the electric motor 180 to the impact mechanism and to the tool holder 140 results in a direct, known dependence of the motor speed with respect to the impact frequency. As a result of this standardization, an oscillation signal, independent of the motor speed, of constant periodicity is achieved, this being shown in FIG. 3*b* by the two from the transformation of the signals belonging to T1 and T2, the two signals then having the same wavelength P1=P2.

Correspondingly, in this embodiment of the disclosure the state-typical model signal shape 240 can be specified, valid for all speeds, by a single parameter of the wavelength over the variable correlating with time, for example the angle of rotation of the tool holder 140, the angle of rotation of the motor, an acceleration, a jerk, in particular a higher-order jerk, an output, or an energy.

In a preferred embodiment, the comparison of the signal of the operating variable 200 in method step S3 takes place by a comparison method, the comparison method comprising at least a frequency-based comparison method and/or a comparative comparison method. The comparison method compares the signal of the operating variable 200 with the state-typical model signal shape 240 to determine whether at least the threshold value of correspondence is satisfied. The comparison method compares the measured signal of the operating variable 200 with the threshold value of correspondence. The frequency-based comparison method comprises at least bandpass filtering and/or frequency analysis. The comparative comparison method comprises at least parameter estimation and/or cross-correlation. The frequency-based comparison method and the comparative comparison method are described in more detail below.

In embodiments with bandpass filtering, the input signal, possibly transformed as described into a variable correlating with time, is filtered via one or more bandpasses, the pass bands of which correspond to one or more state-typical model signal shapes. The pass band results from the state-typical model signal shape 240. It is also conceivable that the pass band corresponds to a frequency specified in connection with the state-typical model signal shape 240. In the case where amplitudes of this frequency exceed a previously specified limit value, as is the case when achieving the progress of work to be detected, the comparison in method step S3 then leads to the result that the signal of the operating variable 200 is equal to the state-typical model signal shape 240 and that therefore the progress of work to be detected has been achieved. The specifying of an amplitude limit value may be understood as meaning in this embodiment ascertainment of the assessment of correspondence of the state-typical model signal shape 240 to the signal of the operating variable 200, on the basis of which a decision is taken in method step S4 as to whether or not the progress of work to be detected has been made.

On the basis of FIG. 10, the embodiment in which frequency analysis is used as the frequency-based comparison method is to be explained. In this case, the signal of the operating variable 200, which is shown in FIG. 10(*a*) and corresponds for example to the progression of the speed of the electric motor 180 over time, is transformed on the basis of frequency analysis, for example fast Fourier transformation (FFT), from a time domain into the frequency domain with corresponding weighting of the frequencies. In this case, the term "time domain" according to the above statements should be understood as meaning both the "progression of the operating variable over time" and the "progression of the operating variable as a variable correlating with time".

Frequency analysis in this manifestation is sufficiently well known as a mathematical tool of signal analysis from many areas of technology and is used, inter alia, to approximate measured signals as series expansions of weighted periodic, harmonic functions of different wavelengths. In FIGS. 10(*b*) and 10(*c*) for example, weighting factors $\kappa_1$ (x) and $\kappa_2$ (x) indicate as functional progressions 203 and 204 over time whether and to what extent the corresponding frequencies or frequency bands, which are not specified at this point for the sake of clarity, are present in the investigated signal, that is to say the progression of the operating variable 200.

With regard to the method according to the disclosure, it is therefore possible with the aid of frequency analysis to establish whether and with what amplitude the frequency assigned to the state-typical model signal shape 240 is present in the signal of the operating variable 200. In addition, it is also possible however to define frequencies which by their absence are a measure that the progress of work to be detected has been made. As mentioned in connection with bandpass filtering, it is possible to specify a limit value of the amplitude, which is a measure of the degree of correspondence of the signal of the operating variable 200 to the state-typical model signal shape 240.

In the example of FIG. 10(*b*) for instance, the amplitude $\kappa_1(x)$ of a first frequency, typically not to be found in the state-typical model signal shape 240, in the signal of the operating variable 200 drops at the time $t_2$ (point $SP_2$) below an associated limit value 203(*a*), which in the example is a necessary but insufficient criterion for ascertaining that the progress of work to be detected has been made. At the time $t_3$ (point $SP_3$), the amplitude $\kappa_2(x)$ of a second frequency, typically to be found in the state-typical model signal shape 240, in the signal of the operating variable 200 exceeds an associated limit value 204(*a*). In the associated embodiment of the disclosure, the coinciding occurrence of transgressions below and above the limit values 203(*a*), 204(*a*) by the amplitude functions $\kappa_1(x)$ and $\kappa_2(x)$, respectively, is the decisive criterion for the assessment of correspondence of the signal of the operating variable 200 to the state-typical model signal shape 240. Correspondingly, in this case it is established in method step S4 that the progress of work to be detected has been achieved.

In alternative embodiments of the disclosure, only one of these criteria is used, or combinations of one of the criteria or of both criteria with other criteria, for example the reaching of a setpoint speed of the electric motor 180.

In embodiments in which the comparative comparison method is used, the signal of the operating variable 200 is compared with the state-typical model signal shape 240, in order to find out whether the measured signal of the operating variable 200 has at least a correspondence of 50% to the state-typical model signal shape 240, and consequently the predetermined threshold value is reached. It is also conceivable that the signal of the operating variable 200 is compared with the state-typical model signal shape 240, in order to determine a correspondence of the two signals to one another.

In embodiments of the method according to the disclosure in which parameter estimation is used as the comparative comparison method, the measured signal of the operating variables 200 is compared with the state-typical model signal shape 240, with parameters that are estimated for the state-typical model signal shape 240 being identified.

With the aid of the estimated parameters, a measure of the correspondence of the measured signal of the operating variables 200 with the state-typical model signal shape 240 can be ascertained, to find out whether the progress of work to be detected has been achieved.

Parameter estimation is based here on curve fitting, which is a mathematical optimization method known to a person skilled in the art. The mathematical optimization method makes it possible with the aid of the estimated parameters to adapt the state-typical model signal shape 240 to a series of measurement data from the signal of the operating variable 200. Depending on a degree of correspondence of the state-typical model signal shape 240 parameterized by means of the estimated parameters and a limit value, the decision as to whether the progress of work to be detected has been achieved can be taken.

With the aid of the curve fitting of the comparative method of parameter estimation, it is also possible to determine a degree of correspondence of the estimated parameters of the state-typical model signal shape 240 with respect to the measured signal of the operating variable 200.

In one embodiment of the inventive method, the method of cross-correlation is used as the comparative comparison method in method step S3. Like the mathematical methods described above, the method of cross-correlation is also known per se to a person skilled in the art. In the method of cross-correlation, the state-typical model signal shape 240 is correlated with the measured signal of the operating variable 200.

In comparison with the method of parameter estimation presented further above, the result of the cross-correlation is again a signal sequence with a signal length added up from a length of the signal of the operating variable 200 and the state-typical model signal shape 240, which represents the similarity of the time-shifted input signals. In this case, the maximum of this output sequence represents the time of the greatest correspondence of the two signals, that is to say the signal of the operating variable 200 and the state-typical model signal shape 240, and is consequently also a measure of the correlation itself, which in this embodiment is used in method step S4 as a decision criterion for the achievement of the progress of work to be detected. In the implementation in the method according to the disclosure, a significant difference from the parameter estimation is that any desired state-typical model signal shapes can be used for the cross-correlation, whereas in the parameter estimation it must be possible for the state-typical model signal shape 240 to be represented by parameterizable mathematical functions.

FIG. 11 shows the measured signal of the operating variable 200 for the case where bandpass filtering is used as the frequency-based comparison method. In this case, time or a variable correlating with time is plotted as the abscissa x. FIG. 11a shows the measured signal of the operating variable, as an input signal of the bandpass filtering, where the handheld power tool 100 is operated in screwing operation in the first region 310. In the second region 320, the handheld power tool 100 is operated in rotary impact operation. FIG. 11b shows the output signal after the bandpass has filtered the input signal.

FIG. 12 shows the measured signal of the operating variable 200 for the case where frequency analysis is used as the frequency-based comparison method. Shown in FIGS. 12a and b is the first region 310, in which the handheld power tool 100 is in screwing operation. Time t or a variable correlating with time is plotted on the abscissa x of FIG. 6a. In FIG. 12b, the signal of the operating variable 200 is shown in a transformed form, it being possible for example by means of a fast Fourier transformation to transform from a time domain into a frequency domain. Plotted on the abscissa x' of FIG. 12b is for example the frequency f, and so the amplitudes of the signal of the operating variable 200 are shown. Shown in FIGS. 12c and d is the second region 320, in which the handheld power tool 100 is in rotary impact operation. FIG. 12c shows the measured signal of the operating variable 200 plotted over time in rotary impact operation. FIG. 12d shows the transformed signal of the operating variable 200, with the signal of the operating variable 200 plotted over the frequency f as abscissa x'. FIG. 12d shows characteristic amplitudes for rotary impact operation.

Figure 13A:
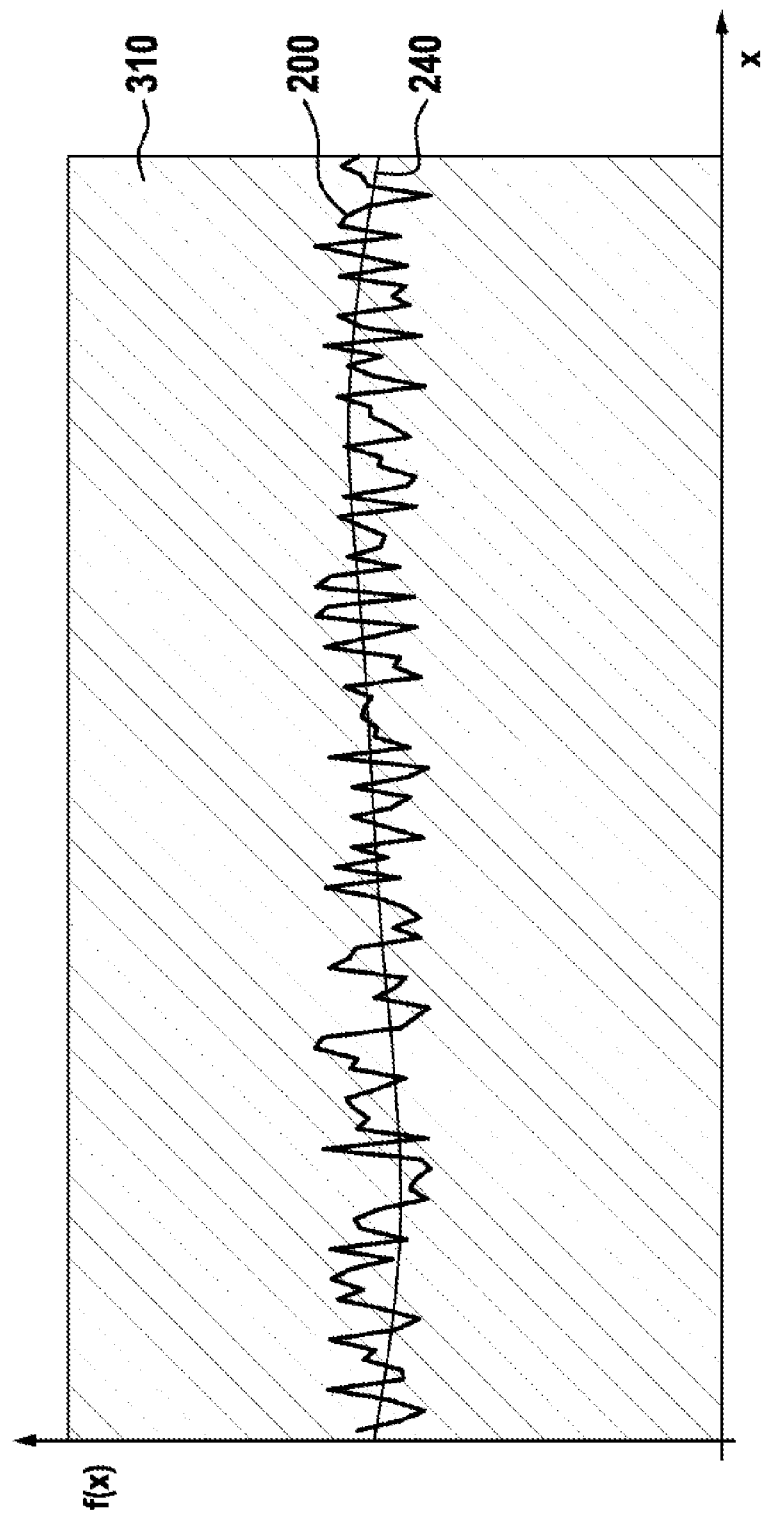
FIG. 13 shows a joint representation of a signal of an operating variable and a model signal for the parameter estimation.

FIG. 13a shows a typical case of a comparison by means of the comparative comparison method of parameter estimation between the signal of an operating variable 200 and a state-typical model signal shape 240 in the first region 310 described in FIG. 2. While the state-typical model signal shape 240 has a substantially trigonometric progression, the signal of the operating variable 200 has a progression that differs greatly therefrom. Independently of the choice of one of the comparison methods described above, the comparison, carried out in method step S3, between the state-typical model signal shape 240 and the signal of the operating variable 200 has in this case the result that the degree of correspondence of the two signals is so low that in method step S4 the progress of work to be detected is not detected.

FIG. 13b, by contrast, shows the case in which the progress of work to be detected has been made, and therefore the state-typical model signal shape 240 and the signal of the operating variable 200 have overall a high degree of correspondence, even if deviations can be found at individual measuring points. Thus, in the comparative comparison method of parameter estimation, the decision can be taken as to whether the progress of work to be detected has been achieved.

Figure 14A:
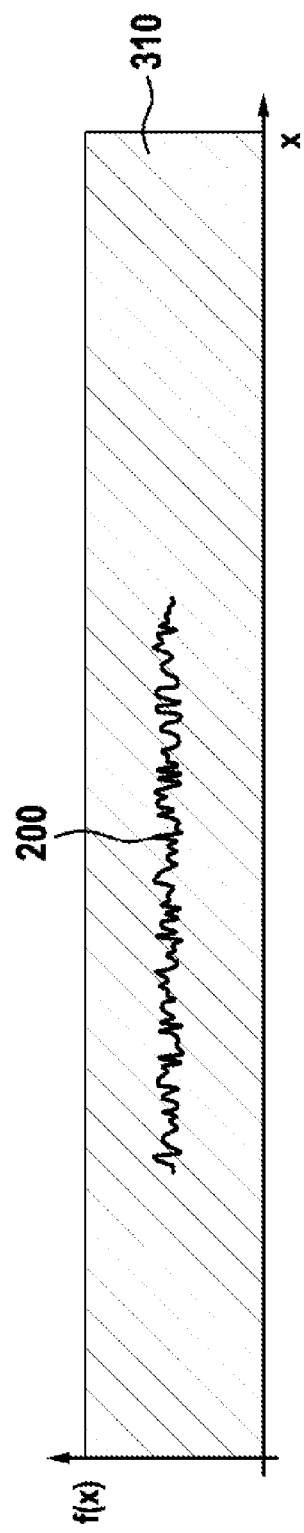
FIG. 14 shows a joint representation of a signal of an operating variable and a model signal for the cross-correlation.
Figure 14B:
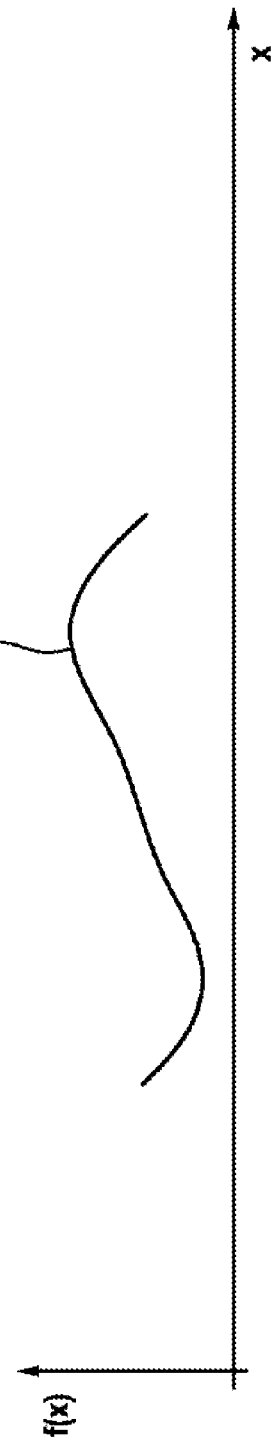
Figure 14E:
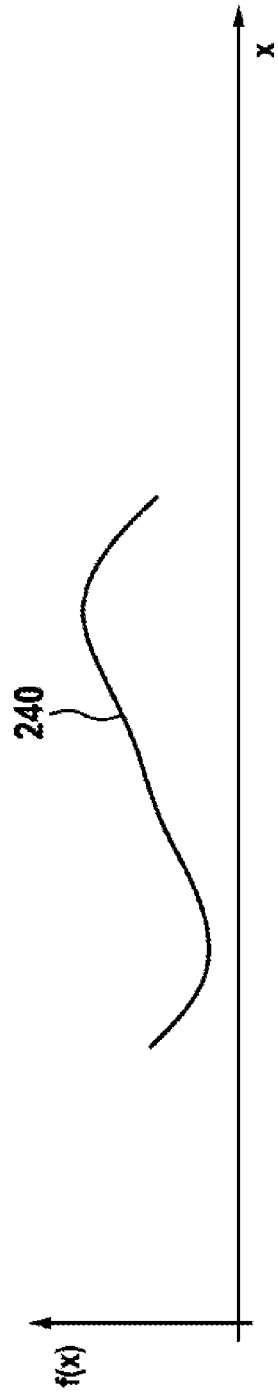
Figure 14F:
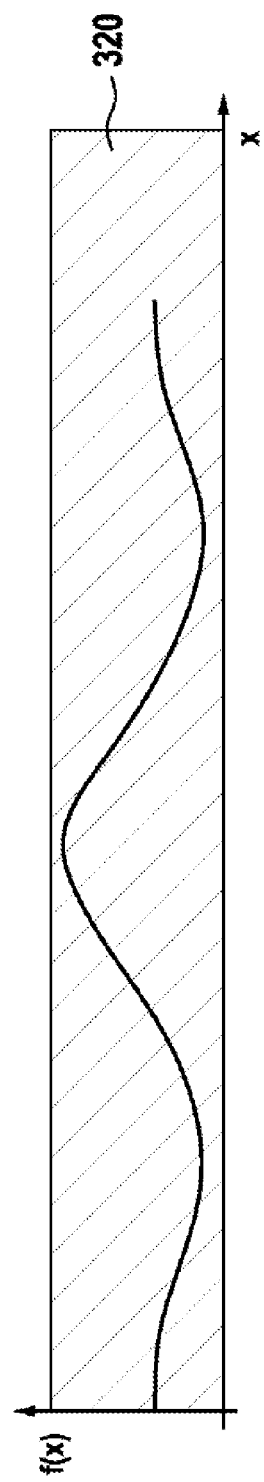

FIG. 14 shows the comparison of the state-typical model signal shape 240, see FIGS. 14b and 14e, with the measured signal of the operating variable 200, see FIGS. 14a and 14d, for the case where cross-correlation is used as the comparative comparison method. In FIGS. 14a-f, time or a variable correlating with time is plotted on the abscissa x. In FIGS. 14a-c, the first region 310, corresponding to screwing operation, is shown. In FIGS. 14d-f, the third region 324, corresponding to the progress of work to be detected, is shown. As described further above, the measured signal of the operating variable, FIG. 14a and FIG. 14d, is correlated with the state-typical model signal shape, FIGS. 14b and 14e. In FIGS. 14c and 14f, respective results of the correlations are shown. In FIG. 14c, the result of the correlation during the first region 310 is shown, it being evident that there is a low correspondence between the two signals. In the example of FIG. 14c, it is therefore decided in method step S4 that the progress of work to be detected has not been achieved. In FIG. 14f, the result of the correlation during the third region 324 is shown. It is evident in FIG. 14f that there is a high correspondence, and so it is decided in method step S4 that the progress of work to be detected has been achieved.

The disclosure is not restricted to the exemplary embodiment described and shown. Rather, it also comprises all developments that a person skilled in the art might make in the scope of the disclosure defined by the claims.

In addition to the embodiments described and depicted, further embodiments, which may comprise further modifications and combinations of features, are conceivable.

The invention claimed is:

1. A method for operating a handheld power tool having an electric motor, the method comprising:
   (S1) providing comparative information by (S1a) providing at least one model signal shape, and assigning the at least one model signal shape to a progress of work of the handheld power tool detected during the progress of work, and (S1b) providing a threshold value of correspondence;
   (S2) ascertaining a signal of an operating variable of the electric motor during the progress of work;
   (S3) ascertaining an assessment of correspondence by comparing the signal of the operating variable with the at least one model signal shape during the progress of work, the assessment of correspondence at least partially taking place based on the threshold value of correspondence; and
   (S4) detecting the progress of work at least partially based on the assessment of correspondence during the progress of work,
   wherein the providing comparative information takes place at least partially based on a learning process that occurs during the progress of work,
   wherein the learning process includes performing and reading in at least one example application of the handheld power tool, the at least one example application including achievement of a specified progress of work of the handheld power tool, and
   wherein the threshold value of correspondence is determined based on the learning process, the learning process further comprising:
   (B1) providing at least one further model signal shape, the at least one further model signal shape being assignable to the progress of work of the handheld power tool;
   (B2) ascertaining a further signal of an operating variable of the electric motor; and
   (B3) comparing the further signal of the operating variable with the at least one further model signal shape at a time when a speed of the electric motor is being reduced during the progress of work and ascertaining a further threshold value of correspondence assigned to the example application during the progress of work.

2. The method as claimed in claim 1, wherein the at least one model signal shape is at least partially provided based on the learning process, the learning process further comprising:
   (A1) ascertaining a further signal of an operating variable of the electric motor based on the example application;
   (A2) determining a first further model signal shape, assigned to the example application, based on the further signal of the operating variable while achieving the specified progress of work; and (A2') determining a second further model signal shape, assigned to the example application, based on the further signal of the operating variable, at a time of achieving the specified progress of work.

3. The method as claimed in claim 2, the learning process further comprising:

one of the performing and reading in at least two example applications; and ascertaining the at least one model signal shape from the first and second further model signal shapes assigned to the at least two example applications.

4. The method as claimed in claim 1, the (B1) providing the at least one further model signal shape further comprising:

(A1) ascertaining a further signal of an operating variable of the electric motor based on the example application;

(A2) determining a first further model signal shape, assigned to the example application, based on the further signal of the operating variable while achieving the specified progress of work;

(A2') determining a second further model signal shape, assigned to the example application, based on the further signal of the operating variable, at a time of achieving the specified progress of work.

5. The method as claimed in claim 1, the learning process further comprising:

one of the performing and reading in at least two example applications; and ascertaining of an average value of the threshold value of correspondence from two or more threshold values of correspondence assigned to the at least two example applications.

6. The method as claimed in claim 1, the reading in the at least one example application further comprising:

reading in an example signal of an operating variable of the electric motor by the handheld power tool.

7. The method as claimed in claim 1 further comprising:

(S5) performing a first routine of the handheld power tool at least partially based on the progress of work.

8. The method as claimed in claim 7, the first routine comprising:

stopping the electric motor while taking into account at least one of a defined parameter, a predetermined parameter, and a parameter predetermined by a user of the handheld power tool.

9. The method as claimed in claim 7, the first routine comprising:

changing a speed of the electric motor.

10. The method as claimed in claim 9, wherein the changing the speed of the electric motor takes place at least one of multiply and dynamically, the changing the speed being at least partially determined based on the learning process based on the example applications.

11. The method as claimed in claim 1, wherein the operating variable is one of a speed of the electric motor and an operating variable correlating with the speed.

12. The method as claimed in claim 1, the (S2) ascertaining the signal of the operating variable further comprising:

recording the signal of the operating variable as one of (i) a progression over time of measured values of the operating variable and (ii) as measured values of the operating variable as a variable of the electric motor correlating with the progression over time.

13. The method as claimed in claim 1, the (S2) ascertaining the signal of the operating variable further comprising:

recording the signal of the operating variable as a progression over time of measured values of the operating variable, wherein the method further comprises, after the (S2) ascertaining the signal of the operating variable:

(S2a) transforming the progression over time of the measured values of the operating variable into a progression of the measured values of the operating variable as a variable of the electric motor correlating with the progression over time.

14. The method as claimed in claim 1, wherein the handheld power tool is an impact screwdriver and the progress of work is impact operation.

15. A handheld power tool comprising:

an electric motor;

a measured-value pickup of an operating variable of the electric motor; and a control unit configured to:

(S1) provide comparative information by (S1a) providing at least one model signal shape, the at least one model signal shape being assignable to a progress of work of the handheld power tool detected during the progress of work, and (S1b) providing a threshold value of correspondence;

(S2) ascertain a signal of an operating variable of the electric motor during the progress of work;

(S3) ascertain an assessment of correspondence by comparing the signal of the operating variable with the at least one model signal shape during the progress of work, the assessment of correspondence at least partially taking place based on the threshold value of correspondence; and (S4) detect the progress of work at least partially based on the assessment of correspondence during the progress of work, wherein the providing comparative information takes place at least partially based on a learning process that occurs during the progress of work, wherein the learning process includes performing and reading in at least one example application of the handheld power tool, the at least one example application including achievement of a specified progress of work of the handheld power tool, and wherein the threshold value of correspondence is determined based on the learning process, the learning process further comprising:

(B1) providing at least one further model signal shape, the at least one further model signal shape being assignable to the progress of work of the handheld power tool;

(B2) ascertaining a further signal of an operating variable of the electric motor; and (B3) comparing the further signal of the operating variable with the at least one further model signal shape at a time when a speed of the electric motor is being reduced during the progress of work and ascertaining a further threshold value of correspondence assigned to the example application during the progress of work.

16. The method as claimed in claim 1, wherein the time when the speed of the electric motor is being reduced is a time when the handheld power tool is being stopped by a user.

17. The method as claimed in claim 10, wherein the changing the speed of the electric motor takes place at least one of staggered over time, along a characteristic curve, and based on the progress of work of the handheld power tool.

18. The method as claimed in claim 14, wherein the handheld power tool is a rotary impact screwdriver and the progress of work is rotary impact operation.

19. The method as claimed in claim 1, wherein:
- the at least one example application is carried out by a user, and
- the threshold value is learned when the user causes the electric motor to stop or when user causes the electric motor to reduce speed during the progress of work.

* * * * *